(12) United States Patent
Vickery

(10) Patent No.: US 11,654,755 B2
(45) Date of Patent: *May 23, 2023

(54) VEHICLE RACK ASSEMBLY

(71) Applicant: ROLL-N-LOCK CORPORATION, Pompano Beach, FL (US)

(72) Inventor: Steve Vickery, Boca Raton, FL (US)

(73) Assignee: ROLL-N-LOCK CORPORATION, Pompano Beach, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/547,821

(22) Filed: Dec. 10, 2021

(65) Prior Publication Data

US 2022/0118834 A1    Apr. 21, 2022

Related U.S. Application Data

(63) Continuation of application No. 16/601,384, filed on Oct. 14, 2019, now Pat. No. 11,220,163.

(60) Provisional application No. 62/751,384, filed on Oct. 26, 2018, provisional application No. 62/776,937, filed on Dec. 7, 2018.

(51) Int. Cl.
*B60J 7/04* (2006.01)
*B60R 9/06* (2006.01)
*B60J 7/19* (2006.01)
*B60J 7/057* (2006.01)

(52) U.S. Cl.
CPC ............... *B60J 7/041* (2013.01); *B60R 9/06* (2013.01); *B60J 7/057* (2013.01); *B60J 7/198* (2013.01)

(58) Field of Classification Search
CPC ..................... B60J 7/041; B60R 9/06

USPC ................................................. 296/3, 98
See application file for complete search history.

(56) References Cited

U.S. PATENT DOCUMENTS

| | | | |
|---|---|---|---|
| 171,736 A | 1/1876 | Mooney |
| 309,767 A | 12/1884 | Clarke |
| 341,307 A | 5/1886 | Altschwager |
| 540,707 A | 6/1895 | Wolf |
| 600,898 A | 3/1898 | Smith |
| 1,127,854 A | 2/1915 | Belankski |
| 1,214,600 A | 2/1917 | Silverthorne |

(Continued)

FOREIGN PATENT DOCUMENTS

| | | |
|---|---|---|
| CN | 108791034 | 11/2018 |
| CN | 109230011 | 1/2019 |

(Continued)

OTHER PUBLICATIONS

Features Comparison. Roll-N-Lock E-Series vs. Pace Edwards Bedlocker, http://rollnlock.com/wp-content/uploads/2013/07/FeatureComparison_E-Series_Eng1.pdf.

(Continued)

*Primary Examiner* — Jason S Morrow
(74) *Attorney, Agent, or Firm* — William H. Honaker; Dickinson Wright PLLC

(57) ABSTRACT

A rack assembly configured to mount to sidewalls of a truck bed of a vehicle. In some embodiments, the rack assembly comprises a pair of side rails configured to secure to the sidewalls of the truck bed, a pair of tracks, and a plurality of mounting brackets configured to mount the pair of tracks to sidewalls of the truck bed and above the side rails so as to transfer vertical load from the tracks to the sidewalls of truck bed.

20 Claims, 25 Drawing Sheets

(56) References Cited

U.S. PATENT DOCUMENTS

| | | |
|---|---|---|
| 1,242,035 A | 10/1917 | Pierson et al. |
| 1,266,521 A | 5/1918 | Norquist |
| 1,272,620 A | 7/1918 | Carlson |
| 1,289,997 A | 12/1918 | Wyeth |
| 1,655,777 A | 1/1928 | Weiland |
| 1,655,797 A | 1/1928 | Peck |
| 1,764,615 A | 6/1930 | Edwards |
| 1,812,580 A | 6/1931 | Black |
| 1,930,841 A | 10/1933 | Miniere |
| 2,067,994 A | 1/1937 | Thwaits |
| 2,483,947 A | 10/1949 | Turner |
| 2,514,466 A | 7/1950 | Bildhauer |
| D160,213 S | 9/1950 | Samuelson |
| 2,530,365 A | 11/1950 | Johnson et al. |
| 2,621,357 A | 12/1952 | Stuman |
| 2,626,179 A | 1/1953 | Gonzalez |
| 2,663,447 A | 12/1953 | Westcott |
| RE23,814 E | 4/1954 | Ingram |
| 2,713,897 A | 7/1955 | Teague et al. |
| 2,720,414 A | 10/1955 | Hart |
| 2,782,972 A | 2/1957 | Binding |
| 2,795,363 A | 6/1957 | Turner |
| 2,795,383 A | 6/1957 | Turner |
| 2,797,959 A | 7/1957 | Brice |
| 2,872,239 A | 2/1959 | Bowness et al. |
| 2,874,885 A | 2/1959 | Young |
| 3,064,868 A | 11/1962 | Treydte |
| 3,142,104 A | 7/1964 | Nielsen, Jr. |
| 3,148,724 A | 9/1964 | Chieger et al. |
| 3,329,385 A | 7/1967 | Dietsch |
| 3,357,670 A | 12/1967 | Larson et al. |
| 3,385,488 A | 5/1968 | Bronson |
| 3,656,801 A | 4/1972 | Doutt et al. |
| 3,675,959 A | 7/1972 | Hansen et al. |
| 3,734,560 A | 5/1973 | Cramblet |
| 3,773,143 A | 11/1973 | Del Prete et al. |
| 3,902,599 A | 9/1975 | Stromberg |
| 3,920,167 A | 11/1975 | Parsons |
| 4,023,850 A | 5/1977 | Tillery |
| 4,063,774 A | 12/1977 | Hanks |
| 4,076,157 A | 2/1978 | Hedstrom et al. |
| 4,132,335 A | 1/1979 | Ingram |
| 4,136,905 A | 1/1979 | Morgan |
| 4,145,044 A | 3/1979 | Wilson et al. |
| 4,166,560 A | 9/1979 | Werner et al. |
| 4,270,681 A | 6/1981 | Ingram |
| 4,295,587 A | 10/1981 | Bott |
| D266,836 S | 11/1982 | Ingram |
| D267,247 S | 12/1982 | Kowalski et al. |
| 4,419,794 A | 12/1983 | Horton, Jr. et al. |
| 4,451,075 A | 5/1984 | Canfield |
| 4,470,716 A | 9/1984 | Welch |
| 4,472,639 A | 9/1984 | Bianchi |
| 4,531,773 A | 7/1985 | Smith |
| 4,585,263 A | 4/1986 | Hesner |
| 4,592,529 A | 6/1986 | Suzuki |
| 4,596,174 A | 6/1986 | Bennett |
| 4,596,417 A | 6/1986 | Bennett |
| 4,635,992 A | 1/1987 | Hamilton |
| 4,650,144 A | 3/1987 | ConraD |
| 4,652,035 A | 3/1987 | Austin, Jr. |
| 4,659,136 A | 4/1987 | Martin et al. |
| D291,789 S | 9/1987 | Noga |
| D294,137 S | 2/1988 | Robson |
| 4,728,019 A | 3/1988 | Olliges |
| 4,749,226 A | 6/1988 | Heft |
| 4,750,773 A | 6/1988 | Chapline |
| 4,770,458 A | 9/1988 | Burke et al. |
| 4,778,213 A | 10/1988 | Palmer |
| 4,786,099 A | 11/1988 | Mount |
| 4,786,119 A | 11/1988 | Smuda |
| 4,793,397 A | 12/1988 | Whiteman |
| 4,795,206 A | 1/1989 | Adams et al. |
| D300,734 S | 4/1989 | Kruitbosch |
| 4,824,158 A | 4/1989 | Peters et al. |
| 4,828,312 A | 5/1989 | Kinkel |
| 4,830,242 A | 5/1989 | Painter |
| 4,850,770 A | 7/1989 | Millar, Jr. |
| 4,860,495 A | 8/1989 | Kessler |
| 4,875,724 A | 10/1989 | Gruber |
| D305,111 S | 12/1989 | Zagner |
| 4,884,317 A | 12/1989 | Liu |
| 4,889,381 A * | 12/1989 | Tamblyn ............... B60J 7/068 296/100.09 |
| D308,627 S | 6/1990 | Guffey |
| 4,953,820 A | 9/1990 | Yoder |
| 4,961,677 A | 10/1990 | Downard, Jr. |
| 5,005,892 A | 4/1991 | Haugen et al. |
| 5,011,349 A | 4/1991 | McAndrews |
| 5,024,409 A | 6/1991 | Bohnen |
| 5,037,152 A | 8/1991 | Hendricks |
| 5,037,153 A | 8/1991 | Stark |
| 5,040,843 A | 8/1991 | Russell et al. |
| D321,496 S | 11/1991 | Sparham et al. |
| 5,083,829 A | 1/1992 | Fonseca |
| D326,076 S | 5/1992 | Wiese |
| 5,114,203 A | 5/1992 | Carnes |
| 5,121,960 A | 6/1992 | Wheatley |
| 5,123,691 A | 6/1992 | Ginn |
| 5,127,697 A | 7/1992 | St. Marie |
| 5,129,665 A | 7/1992 | Sutter et al. |
| 5,139,375 A * | 8/1992 | Franchuk ............... B60P 7/04 296/100.18 |
| 5,147,103 A | 9/1992 | Ducote |
| 5,154,470 A | 10/1992 | Bringman, Jr. |
| 5,169,200 A | 12/1992 | Pugh |
| 5,170,746 A | 12/1992 | Roose |
| 5,201,532 A | 4/1993 | Salesky et al. |
| 5,201,562 A | 4/1993 | Dorsey |
| D337,934 S | 8/1993 | Young |
| 5,234,122 A | 8/1993 | Cherng |
| 5,251,950 A * | 10/1993 | Bernardo ............... B60J 7/041 296/100.09 |
| 5,253,913 A | 10/1993 | Metivier |
| 5,275,458 A | 1/1994 | Barben et al. |
| 5,299,773 A | 4/1994 | Bertrand |
| 5,301,913 A | 4/1994 | Wheatley |
| 5,310,155 A | 5/1994 | Wu |
| 5,310,238 A | 5/1994 | Wheatley |
| 5,330,246 A * | 7/1994 | Bernardo ............... B60J 7/068 160/130 |
| 5,357,376 A | 10/1994 | Yoshida |
| 5,380,141 A | 1/1995 | Flowers |
| 5,385,377 A | 1/1995 | Girard |
| 5,393,114 A * | 2/1995 | Christensen ............... B60R 9/00 296/3 |
| 5,396,915 A | 3/1995 | Bomar |
| 5,417,340 A | 5/1995 | Anthony |
| 5,421,633 A | 6/1995 | Moore et al. |
| D360,614 S | 7/1995 | Alcocer |
| 5,441,324 A | 8/1995 | Gold |
| 5,443,190 A | 8/1995 | Cucheran et al. |
| 5,443,341 A | 8/1995 | Hamilton |
| 5,456,511 A | 10/1995 | Webber |
| 5,460,393 A | 10/1995 | Tsai |
| 5,460,423 A | 10/1995 | Kersting et al. |
| 5,468,038 A | 11/1995 | Sauri |
| 5,470,120 A * | 11/1995 | Christensen ............... B60R 9/00 296/3 |
| D365,323 S | 12/1995 | Napierkowski et al. |
| 5,487,585 A | 1/1996 | Wheatley |
| 5,494,327 A * | 2/1996 | Derecktor ............... B60P 3/40 224/544 |
| 5,500,983 A | 3/1996 | Lautenschlager |
| 5,522,635 A | 6/1996 | Downey |
| 5,540,475 A | 7/1996 | Kersting |
| 5,573,161 A | 11/1996 | Stapleton |
| 5,579,970 A | 12/1996 | Cucheran et al. |
| 5,588,630 A | 12/1996 | Chen-Chao |
| 5,622,296 A | 4/1997 | Pirhonen et al. |
| 5,636,893 A | 6/1997 | Wheatley et al. |
| 5,655,808 A | 8/1997 | Wheatley |
| 5,658,033 A | 8/1997 | Delaune |
| 5,673,958 A | 10/1997 | Gramss |

(56) References Cited

U.S. PATENT DOCUMENTS

| | | |
|---|---|---|
| 5,685,686 A | 11/1997 | Burns |
| 5,700,047 A | 12/1997 | Leitner et al. |
| 5,730,342 A | 3/1998 | Tien |
| 5,743,589 A | 4/1998 | Felker |
| D394,639 S | 5/1998 | Carter |
| 5,752,800 A | 5/1998 | Brincks et al. |
| 5,755,480 A | 5/1998 | Bryan |
| 5,765,892 A | 6/1998 | Covington |
| 5,772,062 A | 6/1998 | Gramss |
| 5,775,759 A | 7/1998 | Cummings |
| 5,782,282 A | 7/1998 | Chen |
| 5,788,311 A | 8/1998 | Tibbals |
| D398,284 S | 9/1998 | Carter et al. |
| 5,806,907 A | 9/1998 | Martinus et al. |
| D399,481 S | 10/1998 | Larson et al. |
| 5,816,637 A | 10/1998 | Adams et al. |
| 5,820,188 A | 10/1998 | Nash |
| 5,823,596 A | 10/1998 | Kulesza |
| 5,839,614 A | 11/1998 | Brown |
| 5,853,116 A | 12/1998 | Schreiner |
| 5,857,724 A | 1/1999 | Jarman |
| 5,857,729 A | 1/1999 | Bogard |
| 5,862,964 A | 1/1999 | Moliner |
| 5,873,688 A | 2/1999 | Wheatley |
| 5,893,500 A | 4/1999 | Cucheran et al. |
| D410,429 S | 6/1999 | Derecktor |
| 5,911,464 A | 6/1999 | White |
| 5,913,465 A | 6/1999 | Potter et al. |
| 5,924,614 A | 7/1999 | Kuntze et al. |
| 5,924,753 A | 7/1999 | DiBassie |
| 5,975,618 A | 11/1999 | Rippberger |
| 5,984,379 A | 11/1999 | Michel et al. |
| D417,859 S | 12/1999 | Leitner et al. |
| D418,106 S | 12/1999 | Leitner et al. |
| 5,997,066 A | 12/1999 | Scott |
| 6,019,410 A | 2/2000 | Trostle et al. |
| 6,024,401 A | 2/2000 | Wheatley et al. |
| 6,024,402 A | 2/2000 | Wheatley |
| 6,039,520 A | 3/2000 | Cheng |
| 6,053,557 A | 4/2000 | Kooiker |
| 6,053,558 A | 4/2000 | Weldy et al. |
| 6,059,159 A | 5/2000 | Fisher |
| 6,076,881 A | 6/2000 | Tucker |
| 6,082,801 A | 7/2000 | Owen et al. |
| 6,092,263 A | 7/2000 | Boue et al. |
| 6,102,265 A | 8/2000 | Stapleton |
| 6,112,964 A | 9/2000 | Cucheran et al. |
| 6,112,965 A | 9/2000 | Lundgren |
| 6,113,173 A | 9/2000 | Leitner et al. |
| 6,113,176 A | 9/2000 | Bernardo |
| 6,113,328 A | 9/2000 | Claucherty |
| 6,120,076 A | 9/2000 | Adsit et al. |
| 6,123,305 A | 9/2000 | LukasavitZ |
| 6,129,490 A | 10/2000 | Erskine et al. |
| 6,149,219 A | 11/2000 | Schambre et al. |
| 6,149,220 A | 11/2000 | Weldy et al. |
| 6,227,593 B1 | 5/2001 | De Valcourt |
| 6,227,602 B1 | 5/2001 | Bogard |
| 6,256,844 B1 | 7/2001 | Wheatley |
| 6,257,637 B1 | 7/2001 | Reed |
| 6,264,266 B1 | 7/2001 | Rusu et al. |
| 6,269,990 B1 | 8/2001 | Gray |
| 6,273,491 B1 | 8/2001 | Bath et al. |
| 6,276,735 B1 | 8/2001 | Champion |
| 6,283,525 B1 | 9/2001 | Morse |
| 6,338,515 B1 | 1/2002 | Munhall |
| 6,340,190 B1 | 1/2002 | Rosebrugh et al. |
| 6,340,194 B1 | 1/2002 | Muirhead et al. |
| 6,350,089 B1 | 2/2002 | Tekavec |
| 6,352,295 B1 | 3/2002 | Leitner |
| 6,378,926 B1 | 4/2002 | Renze et al. |
| 6,390,427 B1 | 5/2002 | McConnell et al. |
| 6,402,215 B1 | 6/2002 | Leitner et al. |
| 6,422,627 B1 | 7/2002 | Kuhn et al. |
| 6,425,618 B1 | 7/2002 | Garland et al. |
| 6,454,338 B1 | 9/2002 | Glickman et al. |
| 6,471,277 B1 | 10/2002 | Scensny et al. |
| 6,488,249 B1 | 12/2002 | Girardi et al. |
| 6,491,192 B2 | 12/2002 | Aki |
| 6,494,520 B2 | 12/2002 | Brzenchek et al. |
| 6,499,791 B2 | 12/2002 | Wheatley |
| 6,513,688 B2 | 2/2003 | Kmita et al. |
| 6,540,123 B1 | 4/2003 | Kmita et al. |
| 6,543,836 B1 | 4/2003 | Wheatley |
| 6,550,841 B1 | 4/2003 | Burdon et al. |
| 6,557,918 B2 | 5/2003 | Iafrate et al. |
| 6,561,560 B2 | 5/2003 | Brown et al. |
| 6,568,740 B1 | 5/2003 | Dimmer |
| 6,575,520 B1 | 6/2003 | Spencer |
| 6,585,465 B1 | 7/2003 | Hammond et al. |
| 6,598,922 B2 | 7/2003 | Morse et al. |
| 6,604,898 B2 | 8/2003 | Price |
| 6,607,228 B2 | 8/2003 | Carter, III et al. |
| 6,626,478 B1 | 9/2003 | Minton |
| 6,637,707 B1 | 10/2003 | Gates et al. |
| D485,800 S | 1/2004 | Smith et al. |
| 6,676,182 B2 | 1/2004 | Fitts |
| 6,719,261 B2 | 4/2004 | Wadsworth |
| 6,719,345 B2 | 4/2004 | Ootsuka et al. |
| 6,722,541 B1 | 4/2004 | Aftanas et al. |
| 6,742,973 B1 | 6/2004 | Hendrix et al. |
| 6,752,449 B1 | 6/2004 | Wheatley |
| 6,752,575 B1 | 6/2004 | Moore et al. |
| 6,789,832 B2 | 9/2004 | Gort et al. |
| 6,796,471 B2 | 9/2004 | Aftanas et al. |
| 6,805,392 B2 | 10/2004 | Leitner et al. |
| 6,811,203 B2 | 11/2004 | Wheatley |
| 6,814,389 B2 | 11/2004 | Wheatley |
| 6,824,191 B2 | 11/2004 | Wheatley |
| 6,843,394 B2 | 1/2005 | Aki |
| D501,443 S | 2/2005 | Jones et al. |
| D504,384 S | 4/2005 | StrascheWski |
| 6,874,747 B2 | 4/2005 | Oh |
| 6,889,878 B2 | 5/2005 | Parsons |
| 6,893,073 B2 | 5/2005 | Wheatley |
| 6,913,175 B2 | 7/2005 | Martin |
| 6,918,624 B2 | 7/2005 | Miller et al. |
| 6,923,488 B2 | 8/2005 | Bruford et al. |
| 6,942,225 B2 | 9/2005 | Gentemann et al. |
| 6,948,763 B2 | 9/2005 | Robbins |
| 6,966,595 B2 | 11/2005 | Bruford et al. |
| 6,971,563 B2 * | 12/2005 | Levi ............... B60R 9/0423 224/403 |
| 6,976,724 B2 | 12/2005 | Wheatley |
| 6,983,972 B2 | 1/2006 | Tan et al. |
| 6,994,389 B1 | 2/2006 | Graffy et al. |
| 6,997,657 B1 | 2/2006 | Saward |
| 7,007,995 B1 | 3/2006 | Scarberry et al. |
| 7,025,403 B2 | 4/2006 | Wheatley |
| 7,040,849 B2 | 5/2006 | Cunningham et al. |
| 7,063,366 B2 | 6/2006 | Leitner et al. |
| 7,093,870 B2 | 8/2006 | Kim et al. |
| 7,100,956 B1 | 9/2006 | Wilkins |
| 7,111,886 B1 | 9/2006 | Miller et al. |
| 7,121,604 B2 | 10/2006 | Reed |
| 7,152,902 B2 | 12/2006 | Moen et al. |
| 7,159,918 B2 | 1/2007 | Lussier |
| 7,175,218 B1 | 2/2007 | Keene |
| 7,175,377 B2 | 2/2007 | Womack et al. |
| 7,182,380 B2 | 2/2007 | Nagle |
| 7,188,888 B2 | 3/2007 | Wheatley et al. |
| 7,195,432 B2 | 3/2007 | Earle et al. |
| 7,204,540 B2 | 4/2007 | Wheatley |
| D544,826 S | 6/2007 | Smith |
| 7,226,100 B1 | 6/2007 | Willey et al. |
| 7,229,116 B1 | 6/2007 | Bruford et al. |
| 7,240,940 B2 | 7/2007 | Leitner |
| 7,252,322 B2 | 8/2007 | Rusu |
| 7,258,387 B2 | 8/2007 | Weldy |
| 7,267,387 B1 | 9/2007 | Bruford et al. |
| D553,072 S | 10/2007 | Smith |
| 7,287,943 B1 | 10/2007 | SaWard |
| 7,303,222 B2 | 12/2007 | Wilkins |
| 7,322,633 B2 | 1/2008 | Zajicek et al. |

(56) References Cited

U.S. PATENT DOCUMENTS

| | | |
|---|---|---|
| 7,334,830 B2 | 2/2008 | Weldy |
| 7,347,473 B2 | 3/2008 | Miller et al. |
| D568,230 S | 5/2008 | Smith |
| 7,384,090 B1 | 6/2008 | Weldy |
| 7,390,044 B2 * | 6/2008 | Marquez ................ B60Q 3/30 362/544 |
| 7,393,035 B2 | 7/2008 | Leitner et al. |
| 7,413,231 B1 | 8/2008 | Wood et al. |
| 7,427,095 B2 | 9/2008 | Wheatley |
| 7,445,264 B2 | 11/2008 | Spencer et al. |
| 7,464,976 B2 | 12/2008 | Smith |
| 7,484,790 B2 | 2/2009 | Wheatley |
| 7,488,021 B1 | 2/2009 | Roos et al. |
| 7,497,493 B1 | 3/2009 | Thiessen et al. |
| 7,506,917 B2 | 3/2009 | Essig |
| 7,513,543 B2 | 4/2009 | Erskine |
| 7,537,264 B2 | 5/2009 | Maimin et al. |
| 7,547,054 B2 | 6/2009 | Leitner |
| 7,549,828 B2 | 6/2009 | Smith |
| D597,924 S | 8/2009 | Smith |
| 7,604,282 B2 | 10/2009 | Spencer et al. |
| 7,607,714 B2 | 10/2009 | Wheatley et al. |
| 7,628,442 B1 | 12/2009 | Spencer et al. |
| 7,654,598 B2 | 2/2010 | Leitner et al. |
| 7,654,599 B2 | 2/2010 | Stewart et al. |
| 7,681,935 B2 | 3/2010 | Leitner et al. |
| D627,703 S | 11/2010 | McLaughlin |
| 7,823,957 B2 | 11/2010 | Williamson |
| 7,841,638 B2 | 11/2010 | Smith |
| 7,845,887 B2 | 12/2010 | Smith |
| 7,857,371 B2 | 12/2010 | Leitner |
| 7,878,568 B2 | 2/2011 | Wu |
| 7,900,990 B2 | 3/2011 | Townson |
| 7,905,536 B2 | 3/2011 | Yue |
| 7,905,539 B2 | 3/2011 | De Carli |
| 7,959,203 B2 | 6/2011 | Smith |
| 8,020,737 B2 | 9/2011 | Sweeney |
| 8,020,912 B2 | 9/2011 | Lounds |
| 8,146,982 B2 | 4/2012 | Williamson et al. |
| 8,262,148 B2 | 9/2012 | Rusher et al. |
| 8,297,677 B2 | 10/2012 | Leitner et al. |
| 8,336,946 B2 | 12/2012 | Schrader et al. |
| 8,366,173 B2 | 2/2013 | Xu |
| 8,474,896 B2 | 7/2013 | Ostberg |
| 8,480,154 B2 | 7/2013 | Yue |
| 8,511,736 B2 | 8/2013 | Williamson et al. |
| 8,672,388 B2 | 3/2014 | Rusher |
| 8,678,459 B1 | 3/2014 | Win |
| 8,727,415 B2 | 5/2014 | Smith |
| 8,807,625 B2 | 8/2014 | Garska |
| 9,266,416 B1 | 2/2016 | Nania |
| 9,346,344 B2 | 5/2016 | Smith et al. |
| 9,352,790 B2 | 5/2016 | Smith |
| 9,399,391 B2 | 7/2016 | Bernardo et al. |
| 9,487,071 B1 | 11/2016 | Yue |
| 9,827,838 B2 | 11/2017 | Hannan et al. |
| 9,827,839 B2 | 11/2017 | Williamson et al. |
| 9,834,076 B2 | 12/2017 | Rohr et al. |
| 9,834,259 B2 | 12/2017 | Smith |
| 9,840,135 B2 | 12/2017 | Rusher et al. |
| 9,840,136 B2 | 12/2017 | Smith et al. |
| 10,081,235 B2 | 9/2018 | Freitas et al. |
| 10,086,746 B2 | 10/2018 | Loew et al. |
| 10,093,159 B1 | 10/2018 | Zichettello et al. |
| 10,094,159 B2 | 10/2018 | Grudzinski et al. |
| 10,099,544 B2 | 10/2018 | Battiato |
| 10,106,022 B2 | 10/2018 | Xu |
| 10,106,089 B2 | 10/2018 | Herman |
| 10,112,465 B2 | 10/2018 | Flocco |
| 10,137,766 B2 | 11/2018 | Bernardo et al. |
| 10,144,276 B2 | 12/2018 | Facchinello et al. |
| 10,166,849 B2 | 1/2019 | Facchinello et al. |
| 10,232,691 B1 | 3/2019 | Weng et al. |
| 10,308,101 B2 | 6/2019 | Kim et al. |
| 10,328,778 B2 | 6/2019 | Aubrey et al. |
| 10,399,421 B2 | 9/2019 | Smith et al. |
| 10,457,124 B2 | 10/2019 | Bernardo |
| 10,647,187 B2 | 5/2020 | Slinger et al. |
| 10,800,231 B2 | 10/2020 | Bernardo et al. |
| 10,850,676 B1 * | 12/2020 | Worker ................ B60P 7/15 |
| 10,919,369 B2 | 2/2021 | Lewis et al. |
| 11,040,605 B2 | 6/2021 | Bernardo |
| 2001/0005960 A1 | 7/2001 | Yamaguchi et al. |
| 2002/0000732 A1 | 1/2002 | Sanders |
| 2002/0096268 A1 | 7/2002 | Schmeichel et al. |
| 2002/0180235 A1 | 12/2002 | Wheatley |
| 2004/0080174 A1 | 4/2004 | Buelna |
| 2004/0124658 A1 | 7/2004 | Wheatley |
| 2004/0134953 A1 | 7/2004 | Perez |
| 2005/0077747 A1 | 4/2005 | De Gaillard et al. |
| 2006/0091170 A1 | 5/2006 | Almhil |
| 2006/0091171 A1 | 5/2006 | Wardell et al. |
| 2006/0119127 A1 * | 6/2006 | Landrith ................ B60J 7/19 296/100.04 |
| 2006/0131934 A1 | 6/2006 | Uchida et al. |
| 2006/0208524 A1 | 9/2006 | Brown et al. |
| 2006/0263163 A1 | 11/2006 | Harberts et al. |
| 2006/0267370 A1 | 11/2006 | Wheatley et al. |
| 2006/0283900 A1 | 12/2006 | Stapleton |
| 2007/0063529 A1 | 3/2007 | Weldy |
| 2007/0096486 A1 | 5/2007 | Niedziela et al. |
| 2007/0108792 A1 | 5/2007 | Weldy |
| 2007/0170739 A1 | 7/2007 | Sims |
| 2007/0262602 A1 | 11/2007 | Nagle |
| 2008/0101883 A1 | 5/2008 | Derecktor |
| 2008/0106114 A1 | 5/2008 | Wheatley |
| 2008/0129077 A1 | 6/2008 | Weldy |
| 2008/0143133 A1 * | 6/2008 | Nichols ................ B60P 7/0815 296/136.03 |
| 2008/0179911 A1 | 7/2008 | Spencer et al. |
| 2009/0020576 A1 | 1/2009 | Gale |
| 2009/0146449 A1 | 6/2009 | Steffens et al. |
| 2010/0283280 A1 | 11/2010 | Kohlstrand et al. |
| 2011/0175387 A1 | 7/2011 | Smith |
| 2012/0274091 A1 | 11/2012 | Yue |
| 2012/0274092 A1 | 11/2012 | Yue |
| 2012/0274093 A1 | 11/2012 | Yue |
| 2012/0319423 A1 | 12/2012 | Smith |
| 2013/0026202 A1 * | 1/2013 | Williams ................ B60R 9/06 224/405 |
| 2013/0119693 A1 | 5/2013 | Leitner et al. |
| 2013/0341960 A1 | 12/2013 | Garska |
| 2015/0001877 A1 | 1/2015 | Fink |
| 2015/0054300 A1 | 2/2015 | Shi et al. |
| 2015/0061315 A1 | 3/2015 | Facchinello et al. |
| 2015/0102077 A1 | 4/2015 | Martin |
| 2016/0263974 A1 | 9/2016 | Xu |
| 2017/0066311 A1 | 3/2017 | Facchinello et al. |
| 2017/0144520 A1 | 5/2017 | Hemphill et al. |
| 2017/0174119 A1 * | 6/2017 | Hemphill ................ B60R 9/00 |
| 2017/0197498 A1 | 7/2017 | Facchinello et al. |
| 2017/0326956 A1 | 11/2017 | Marshall |
| 2017/0341494 A1 | 11/2017 | Hannan et al. |
| 2017/0349081 A1 | 12/2017 | Yilma et al. |
| 2017/0355251 A1 | 12/2017 | Rossi |
| 2017/0361755 A1 | 12/2017 | Yilma et al. |
| 2018/0022398 A1 * | 1/2018 | Schlaupitz ......... B62D 33/0207 224/405 |
| 2018/0111542 A1 * | 4/2018 | Mueller ................ B60R 9/06 |
| 2018/0147925 A1 | 5/2018 | Williamson et al. |
| 2018/0272930 A1 | 9/2018 | Dylewski et al. |
| 2018/0281572 A1 | 10/2018 | Zichettello et al. |
| 2018/0281573 A1 | 10/2018 | Zichettello et al. |
| 2018/0281574 A1 | 10/2018 | Zichettello et al. |
| 2018/0281575 A1 | 10/2018 | Singer |
| 2018/0281576 A1 | 10/2018 | Zichettello et al. |
| 2018/0290527 A1 | 10/2018 | Marchlewski et al. |
| 2018/0290529 A1 | 10/2018 | Ching |
| 2018/0297456 A1 | 10/2018 | Stickles et al. |
| 2018/0339578 A1 | 11/2018 | Sullivan |
| 2018/0339581 A1 | 11/2018 | Rossi et al. |
| 2018/0339658 A1 | 11/2018 | Frederick et al. |
| 2018/0345768 A1 | 12/2018 | Frederick et al. |
| 2018/0345769 A1 | 12/2018 | Dylewski et al. |

(56) References Cited

U.S. PATENT DOCUMENTS

| | | |
|---|---|---|
| 2019/0100087 A1 | 4/2019 | Facchinello et al. |
| 2019/0118629 A1 | 4/2019 | Spencer |
| 2019/0168590 A1 | 6/2019 | O'Reilly |
| 2019/0291553 A1 | 9/2019 | Ma |
| 2019/0375337 A1 | 12/2019 | Gauci |
| 2019/0381947 A1* | 12/2019 | Fehr .................. B60R 9/10 |
| 2020/0016642 A1 | 1/2020 | Kraft et al. |
| 2020/0056639 A1 | 2/2020 | Voegele et al. |
| 2020/0094660 A1 | 3/2020 | Ma |
| 2020/0108702 A1 | 4/2020 | Dylweski, II et al. |
| 2020/0130483 A1 | 4/2020 | Vickery |
| 2020/0148046 A1 | 5/2020 | Ma |
| 2021/0129640 A1* | 5/2021 | D'Hoore ............. B60J 7/041 |
| 2021/0129919 A1 | 5/2021 | Smith |

FOREIGN PATENT DOCUMENTS

| | | |
|---|---|---|
| CN | 106564417 | 5/2019 |
| DE | 1455831 | 8/1964 |
| DE | 2729235 | 1/1979 |
| DE | 3445021 | 12/1984 |
| EP | 0736417 | 4/1996 |
| FR | 2781249 | 1/2000 |
| SU | 0629098 | 10/1978 |
| WO | WO 1994/001298 | 1/1994 |
| WO | WO 2016/022164 | 2/2016 |

OTHER PUBLICATIONS

Roll-N-Lock 2015 Catalog for M-Series and A-series retractable truck bed covers.http://rollnlock.com/wp-content/uploads/2015/03/RNL_Catalog_2015_WEB.pdf.

* cited by examiner

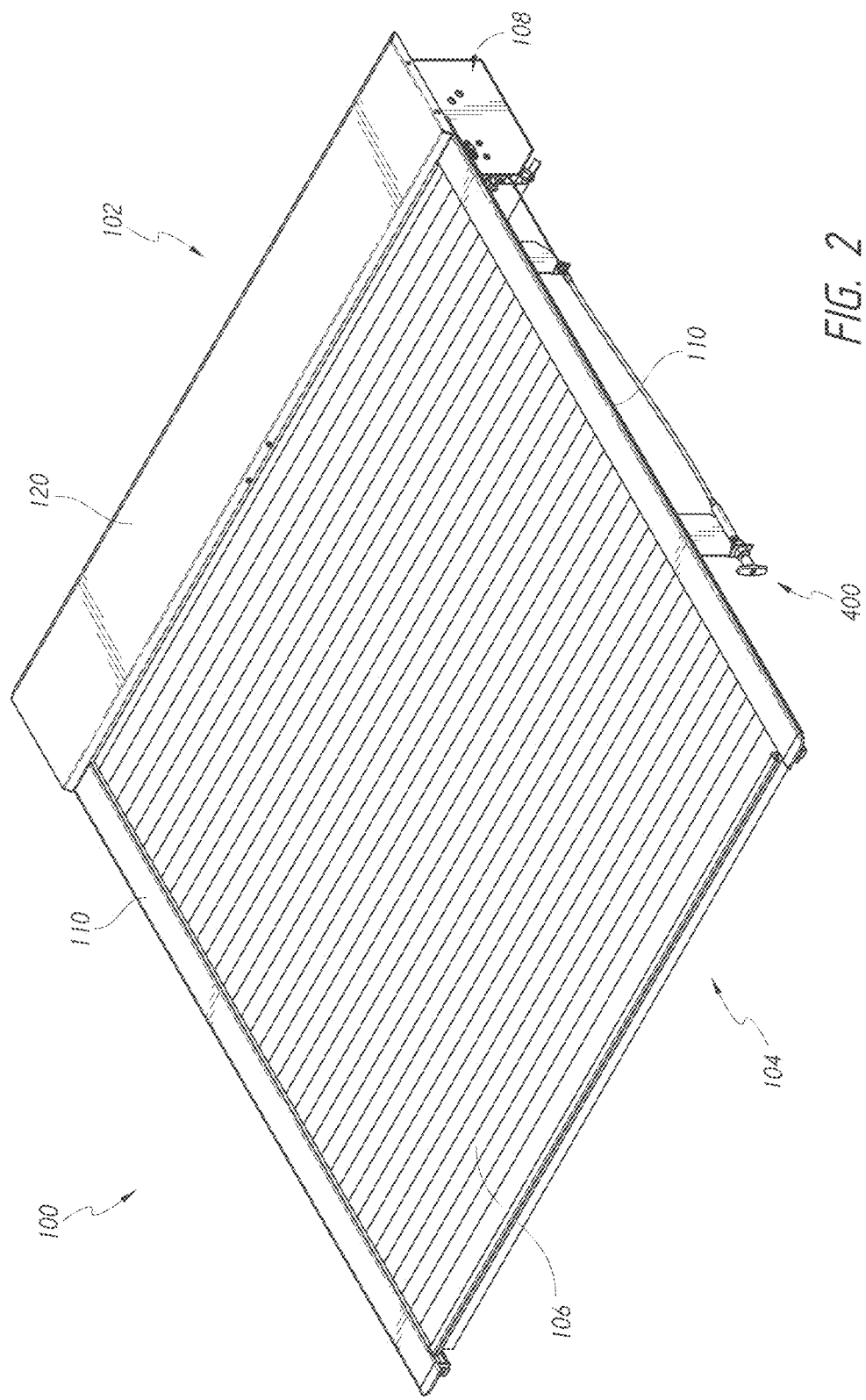

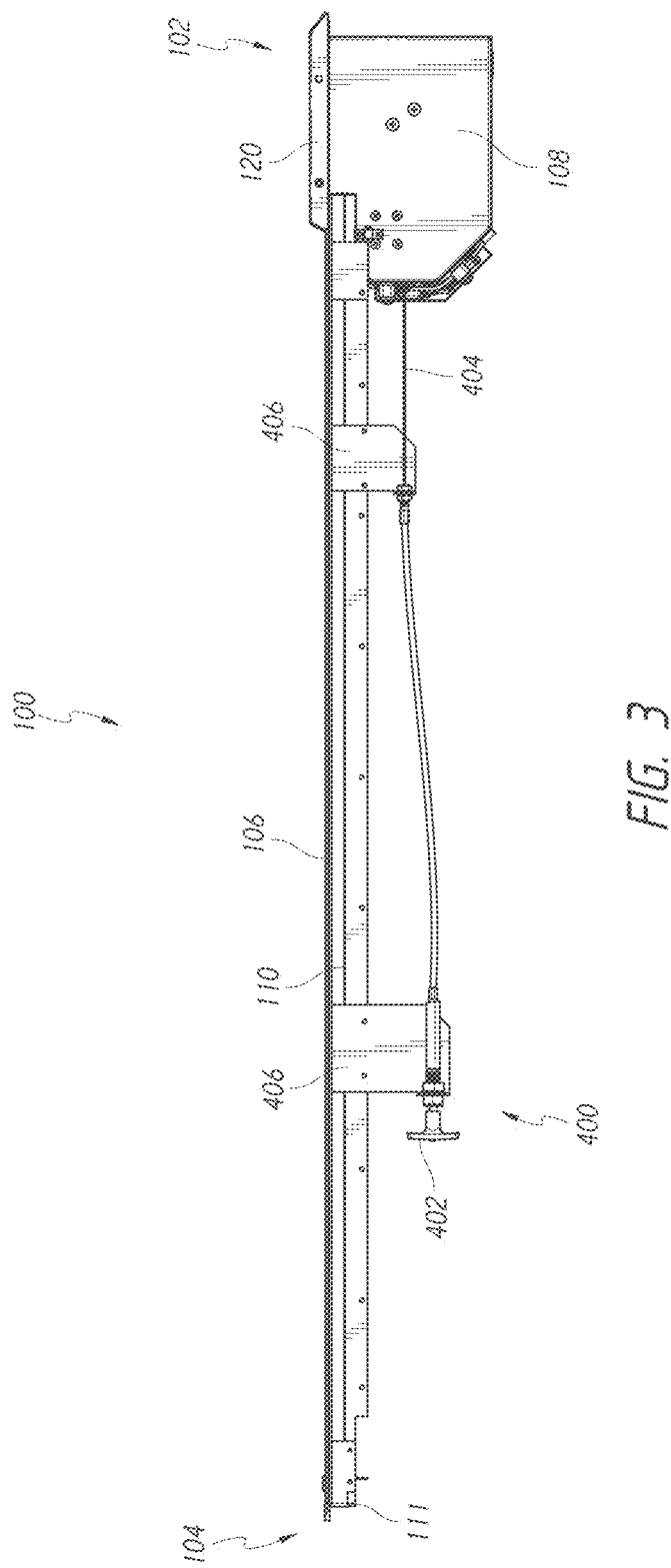

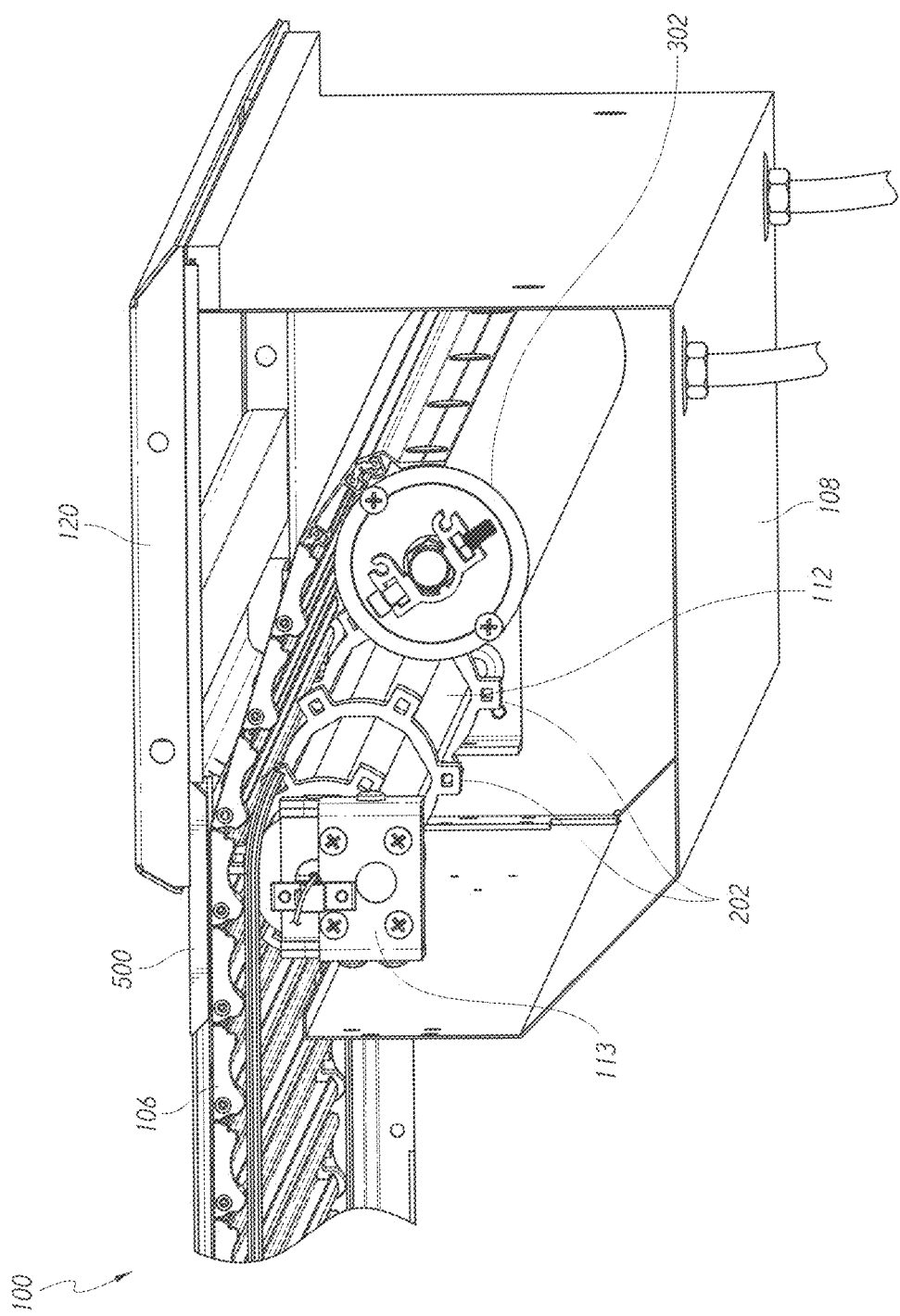

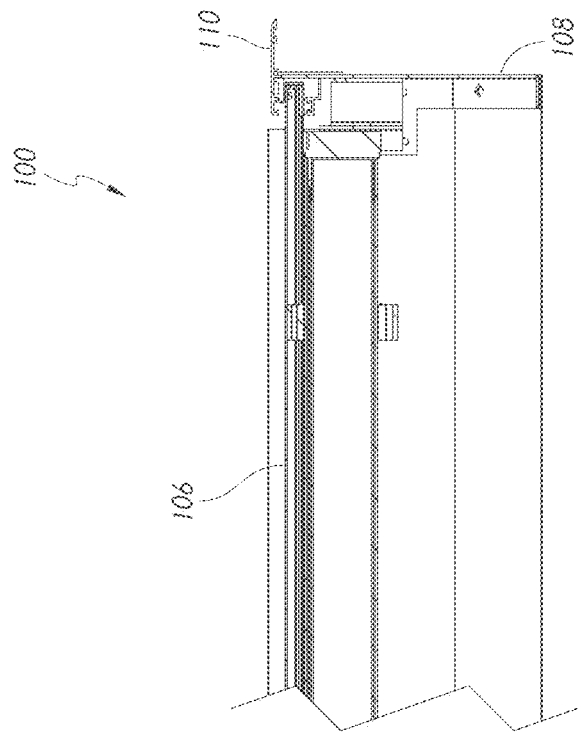
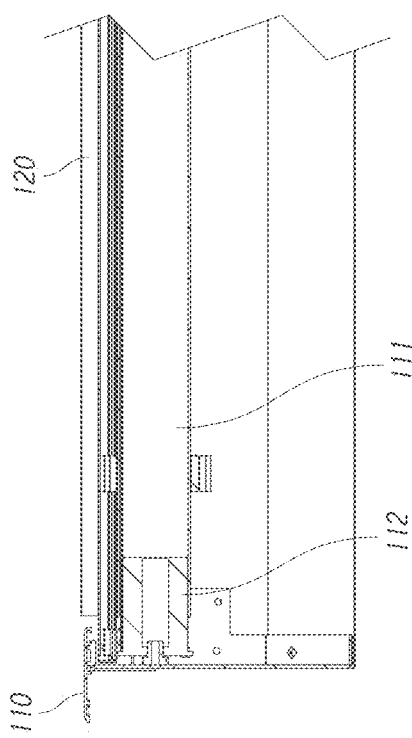
FIG. 5

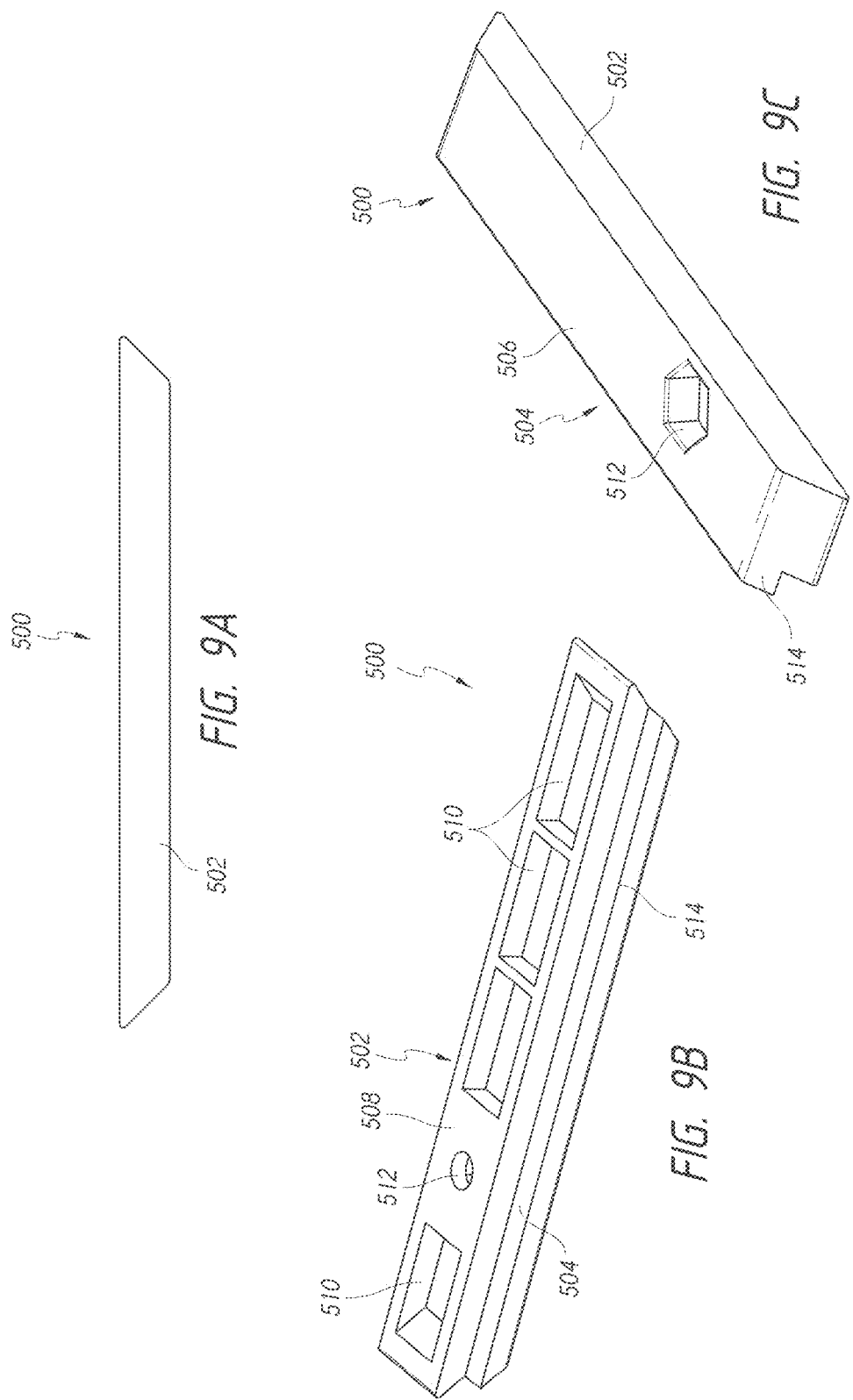

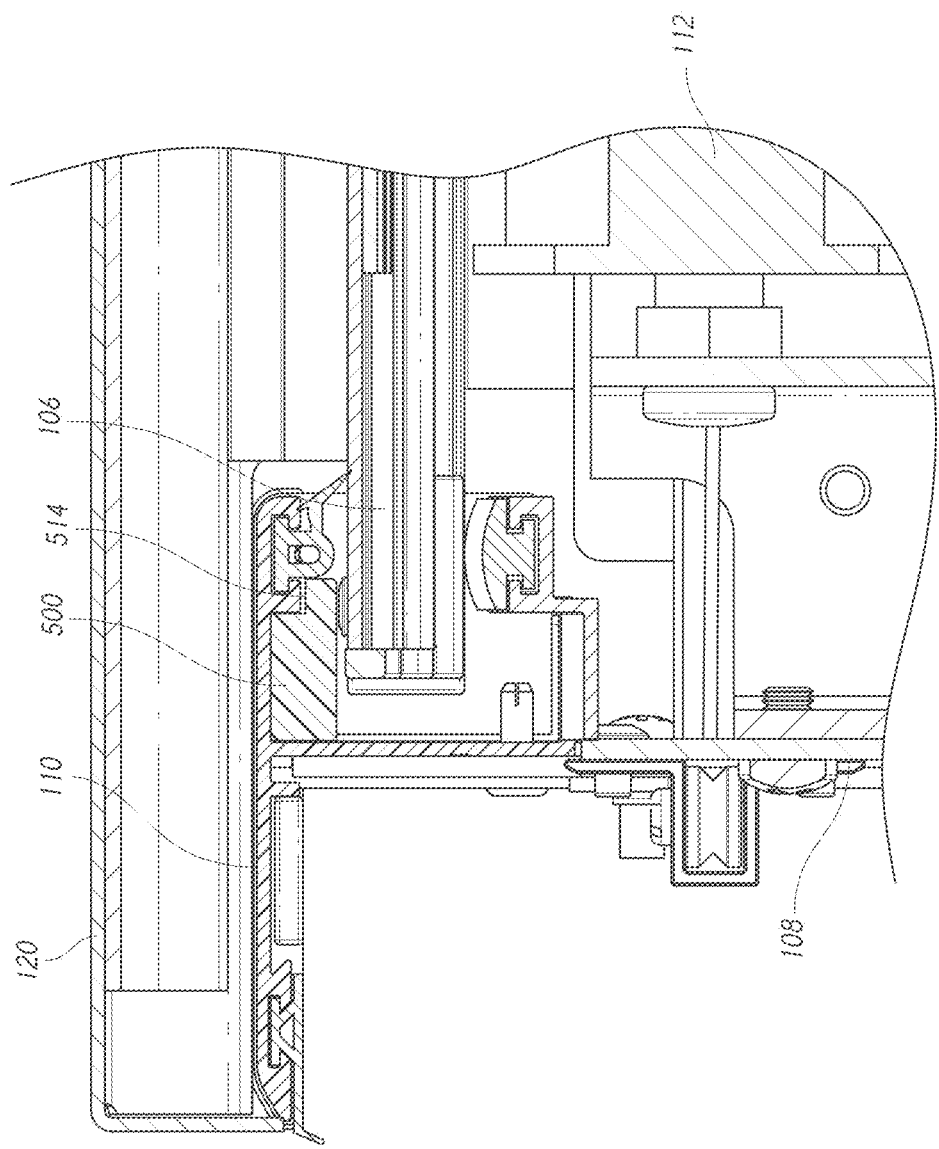

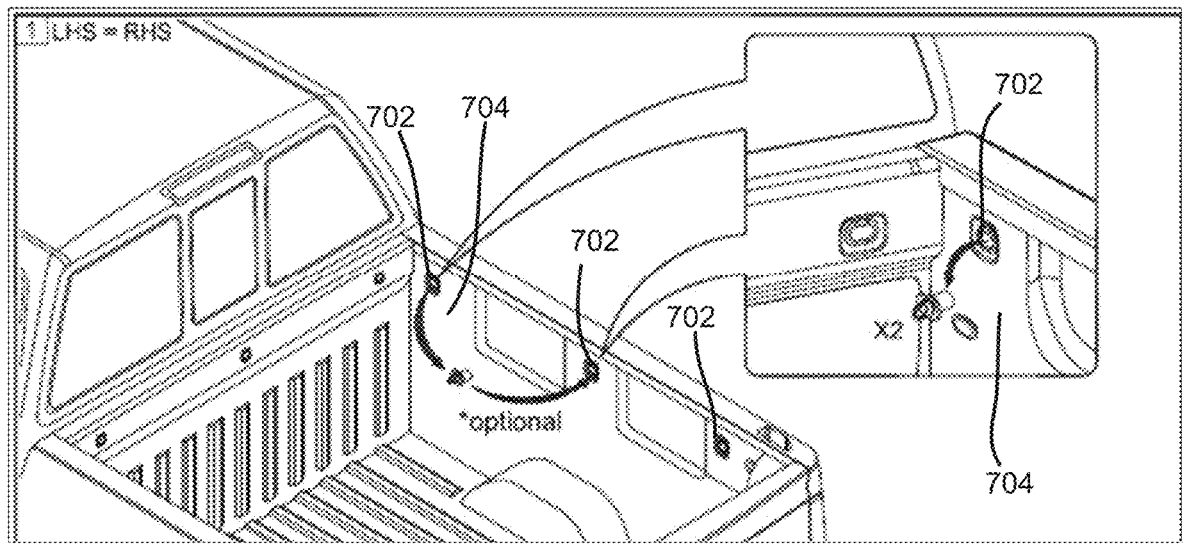
FIG. 20A
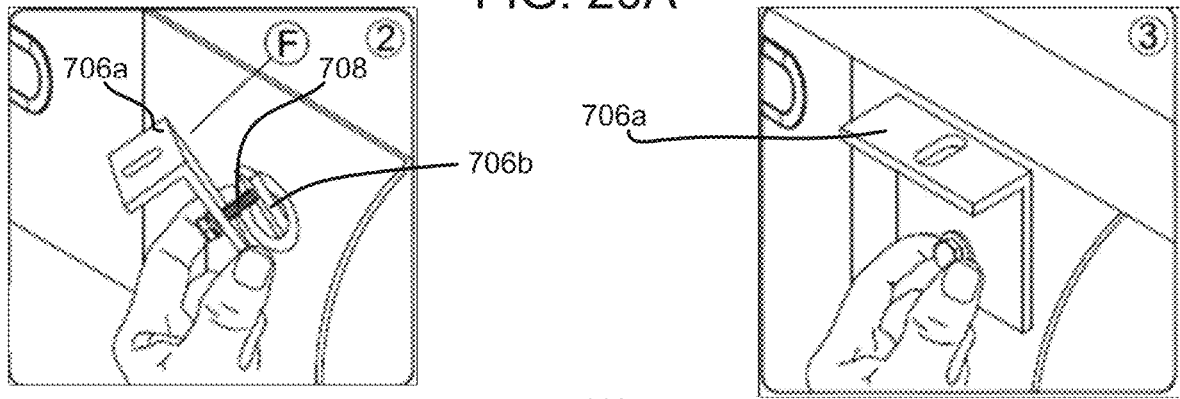
FIG. 20B
FIG. 20C
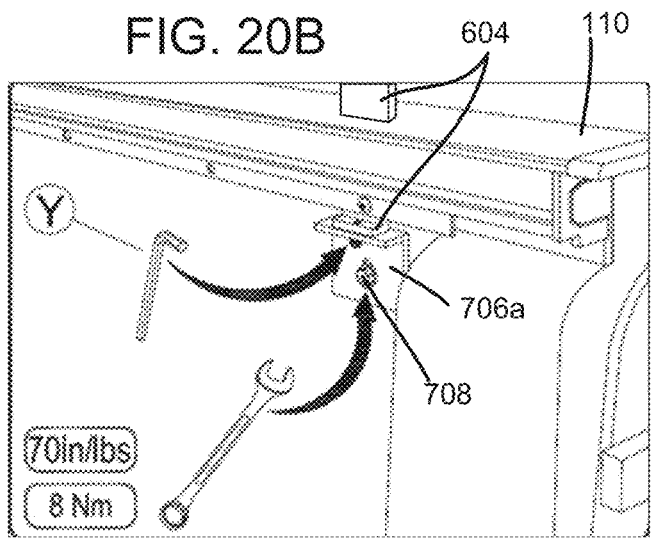
FIG. 20D
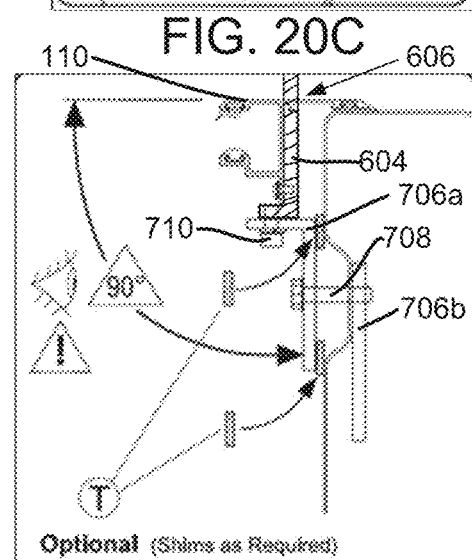
FIG. 20E

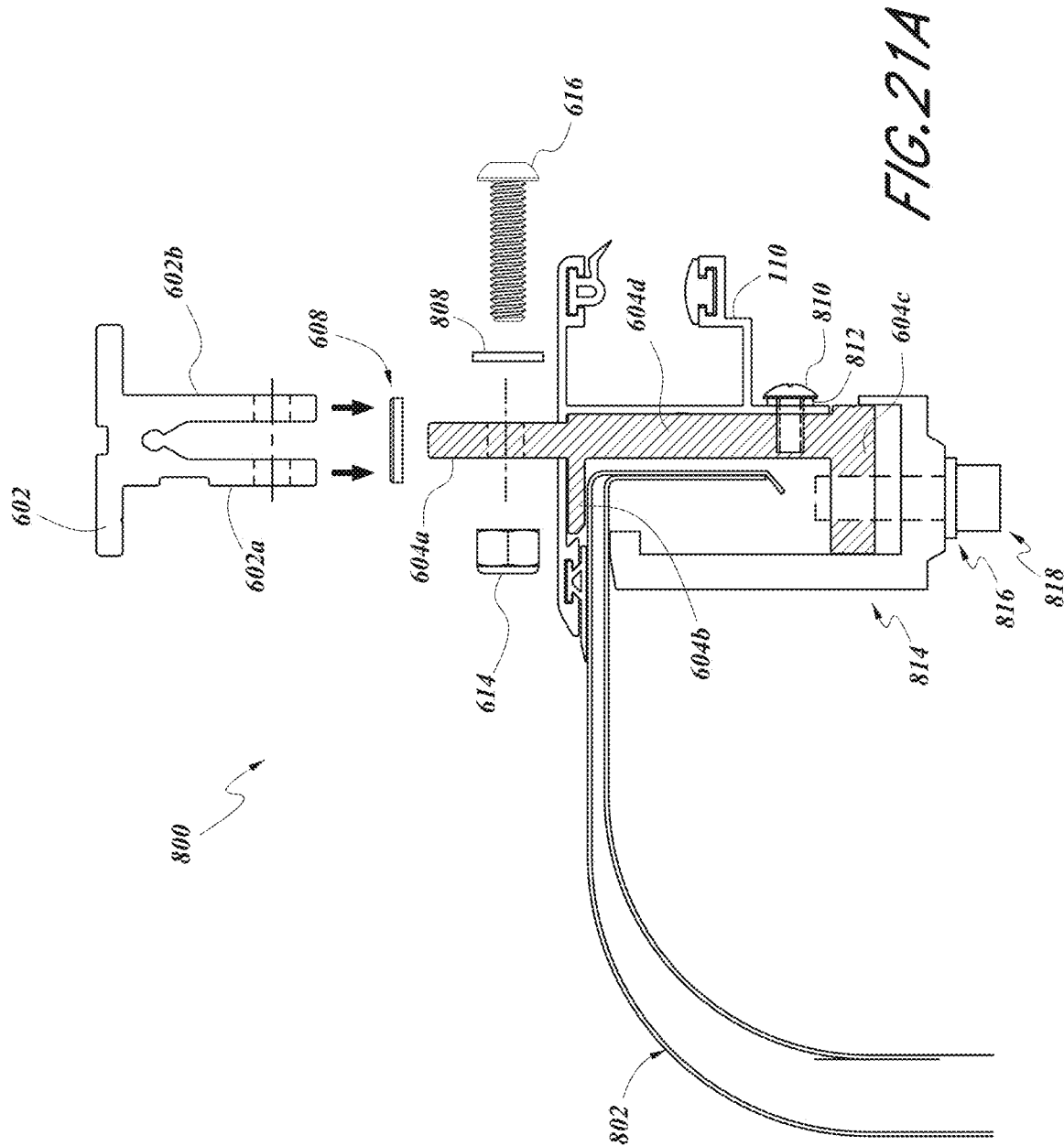

VEHICLE RACK ASSEMBLY

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND

Field

This disclosure relates generally to vehicle rack assemblies, such as rack assemblies that attach to a truck bed.

Description of the Related Art

Rack assemblies have been used to add storage space above or within truck beds. Some rack assemblies are used in tandem with tonneau covers to make the space above the tonneau cover usable. Such rack assemblies typically connect and/or apply load to portions of the tonneau cover or side rails that receive the tonneau cover. However, the maximum vertical load that the tonneau cover and/or side rails receiving the tonneau cover can support is limited, especially in relation to the load capacity of sidewalls of a truck bed.

SUMMARY

The systems, methods, and devices of this disclosure each have several innovative aspects, no single one of which is solely responsible for the desirable attributes disclosed herein.

Disclosed herein is a tonneau cover and rack assembly configured to mount to sidewalls of a truck bed of a vehicle. In some embodiments, the tonneau cover and rack assembly comprises: a pair of side rails configured to secure to the sidewalls of the truck bed; a retractable cover received by the pair of side rails; a pair of tracks configured to transfer vertical load to the sidewalls of the truck bed, each of the pair of tracks comprising at least one mounting location; and a plurality of mounting brackets, each mounting bracket comprising a first portion configured to secure to one of the sidewalls of the truck bed and a second portion configured to pass through an opening in one of the side rails and secure to one of the tracks, wherein, when the second portion of each mounting bracket is secured to one of the tracks, a gap exists between a bottom surface of the track and a top surface of one of the side rails such that a primary vertical load is supported by the sidewall of the truck bed as opposed to the side rail.

In some embodiments, the at least one mounting location comprises a glider configured to secure to and slide along the tracks. In some embodiments, the glider comprises a substantially horizontal top portion and side arms extending laterally from the top portion, the side arms configured to wrap around sides of the tracks so as to restrict movement of the glider with respect to the tracks in a first direction, wherein the first direction is generally perpendicular to an axis extending from a first end of the tracks to a second end of the tracks. In some embodiments, each of the tracks comprise a recess extending along a portion of each of the tracks, wherein the top portion of the glider comprises a through-hole aligned with the recess of the tracks and configured to allow a fastener to pass therethrough and contact the recess. The tonneau cover and rack assembly can further comprise end caps configured to prevent the glider from sliding off the tracks. In some embodiments, the end caps comprise a first portion configured to secure to the ends of the tracks and a second portion configured to extend at least partially above the tracks.

In some embodiments, the pair of tracks comprise at least four mounting locations. In some embodiments, each of the tracks comprise two mounting locations, wherein each of the two mounting locations on each track are aligned with a corresponding one on the other track. The tonneau cover and rack assembly can further comprise two cross bars, wherein each of the tracks comprise two mounting locations, each of the two cross bars configured to secure to one of the two mounting locations on each of the tracks.

The tonneau cover and rack assembly can further comprise a cross bar, wherein the at least one mounting location comprises a first mounting location on one of the tracks and a second mounting location on another one of the tracks, and wherein the cross bar is configured to secure to both the first and second mounting locations and extend across the truck bed.

In some embodiments, the tracks comprise a substantially horizontal top portion and a bottom portion extending generally perpendicularly from the top portion, the bottom portion comprising two stems configured to receive the second portions of the mounting brackets therewithin. In some embodiments, each of the two stems comprise openings aligning with openings of the second portions of the mounting brackets, the openings configured to receive fasteners for securing the two stems to the mounting brackets.

In some embodiments, the first portion of each of the plurality of mounting brackets is generally perpendicular to the second portion and is configured to secure to one of the sidewalls of the truck bed with a clamp. In some embodiments, each of the plurality of mounting brackets can support a load of 350 lbs. In some embodiments, the retractable cover received by the pair of side rails comprises a plurality of connected slats extending between the side rails.

Disclosed herein is a rack assembly configured to mount to sidewalls of a truck bed of a vehicle. In some embodiments, the rack assembly comprises: a pair of side rails configured to secure to the sidewalls of the truck bed; a pair of tracks configured to transfer vertical load to the sidewalls of the truck bed, each of the pair of tracks comprising at least one mounting location; and a plurality of mounting brackets, each mounting bracket configured to pass through an opening in one of the side rails, each mounting bracket comprising a first portion configured to secure to one of the sidewalls of the truck bed and a second portion configured to secure to one of the tracks, wherein, when the second portion of each mounting bracket is secured to one of the tracks, a gap exists between a bottom surface of the track and a top surface of one of the side rails.

In some embodiments, the at least one mounting location of each of the pair of tracks of the rack assembly comprises a glider configured to secure to and slide along the tracks. In some embodiments, the glider comprises a substantially horizontal top portion and side arms extending laterally from the top portion, the side arms configured to wrap around sides of the tracks so as to restrict movement of the glider with respect to the tracks in a first direction, wherein the first direction is generally perpendicular to an axis extending from a first end of the tracks to a second end of the tracks. In some embodiments, each of the tracks comprise a recess extending along a portion of each of the tracks, wherein the top portion of the glider comprises a through-hole aligned with the recess of the tracks and configured to allow a fastener to pass therethrough and contact the recess. The rack assembly can further comprise end caps configured to prevent the glider from sliding off the tracks, the end caps comprising a first portion configured to secure to the ends of the tracks and a second portion configured to extend at least partially above the tracks. In some embodiments, the pair of tracks comprise at least four mounting locations. In some embodiments, each of the tracks comprise two mounting locations, each of the two mounting locations on each track aligned with a corresponding one on the other track. The rack assembly can comprise two cross bars, wherein each of the tracks comprise two mounting locations, each of the two cross bars configured to secure to one of the two mounting locations on each of the tracks. The rack assembly can comprise a cross bar, wherein the at least one mounting location comprises a first mounting location on one of the tracks and a second mounting location on another one of the tracks, and wherein the cross bar is configured to secure to both the first and second mounting locations and extend across the truck bed.

In some embodiments, the tracks of the rack assembly comprise a substantially horizontal top portion and a bottom portion extending generally perpendicularly from the top portion, the bottom portion comprising two stems configured to receive the second portions of the mounting brackets therewithin. In some embodiments, each of the two stems comprise openings aligning with openings of the second portions of the mounting brackets, the openings configured to receive fasteners for securing the two stems to the mounting brackets.

In some embodiments, the first portion of each of the plurality of mounting brackets is a bottom portion of the mounting bracket, the bottom portion configured to secure to a clamp, and wherein the second portion is a top portion of the mounting bracket. In some embodiments, each of the plurality of mounting brackets further comprise an intermediate portion located in between the top and bottom portions and configured to contact a top surface of the sidewall of the truck bed when the mounting bracket is secured thereto. In some embodiments, each of the plurality of mounting brackets can support a load of 350 lbs. In some embodiments, the retractable cover received by the pair of side rails comprises a plurality of connected slats extending between the side rails.

Disclosed herein is a method of assembling a rack above a truck bed of a vehicle, comprising: inserting mounting brackets through openings in a plurality of side rails, wherein the plurality of side rails are configured to receive a retractable cover; securing the side rails to sidewalls of the truck bed; securing first portions of the mounting brackets to tracks extending in a direction parallel to the side rails such that a gap exists between a bottom surface of the tracks and a top surface of the side rails, wherein the tracks comprise at least one mounting location; securing second portions of the mounting brackets to the sidewalls of the truck bed; and securing one or more cross bars to the at least one mounting location of the tracks.

The step of inserting mounting brackets through openings in the plurality of side rails can be carried out before the step of securing first portions of the mounting brackets to the tracks. The step of inserting mounting brackets through openings in the plurality of side rails can be carried out after the step of securing second portions of the mounting brackets to the sidewalls of the truck bed. The step of securing second portions of the mounting brackets to the sidewalls of the truck bed can be carried out before the step of securing first portions of the mounting brackets to tracks.

In some embodiments, the at least one mounting location comprises a glider configured to secure to and slide along the tracks. The glider can comprise a substantially horizontal top portion and side arms extending laterally from the top portion, wherein the side arms are configured to wrap around sides of the tracks so as to restrict movement of the glider with respect to the tracks in a first direction, wherein the first direction is generally perpendicular to an axis extending from a first end of the tracks to a second end of the tracks.

In some embodiments, the step of securing second portions of the mounting brackets to the sidewalls of the truck bed comprises securing the second portions to clamps and securing the clamps to the sidewalls of the truck bed.

BRIEF DESCRIPTION OF THE DRAWINGS

FIG. 2 illustrates a perspective view of a retractable tonneau cover.

FIG. 3 illustrates a side view of a retractable tonneau cover.

FIGS. 4A-4C illustrate a side view of a retractable tonneau cover with outer housing components removed.

FIG. 5 illustrates a front-on view of a retractable tonneau cover.

FIGS. 9A-9C illustrates views of an engagement pad that can be used with the retractable tonneau cover.

FIG. 11 illustrates a cross-section view of a replacement tonneau cover.

FIGS. 12A-19 illustrate embodiments of a rack assembly configured to mount to sidewalls of a truck bed of a vehicle.

FIGS. 20A-20E illustrate a method and assembly for securing the rack assembly to sidewalls of a truck bed using the mounting brackets discussed herein.

FIGS. 21A-21B illustrate another method and assembly for securing the rack assembly to sidewalls of a truck bed using the mounting brackets discussed herein.

DETAILED DESCRIPTION

Figure 1A:
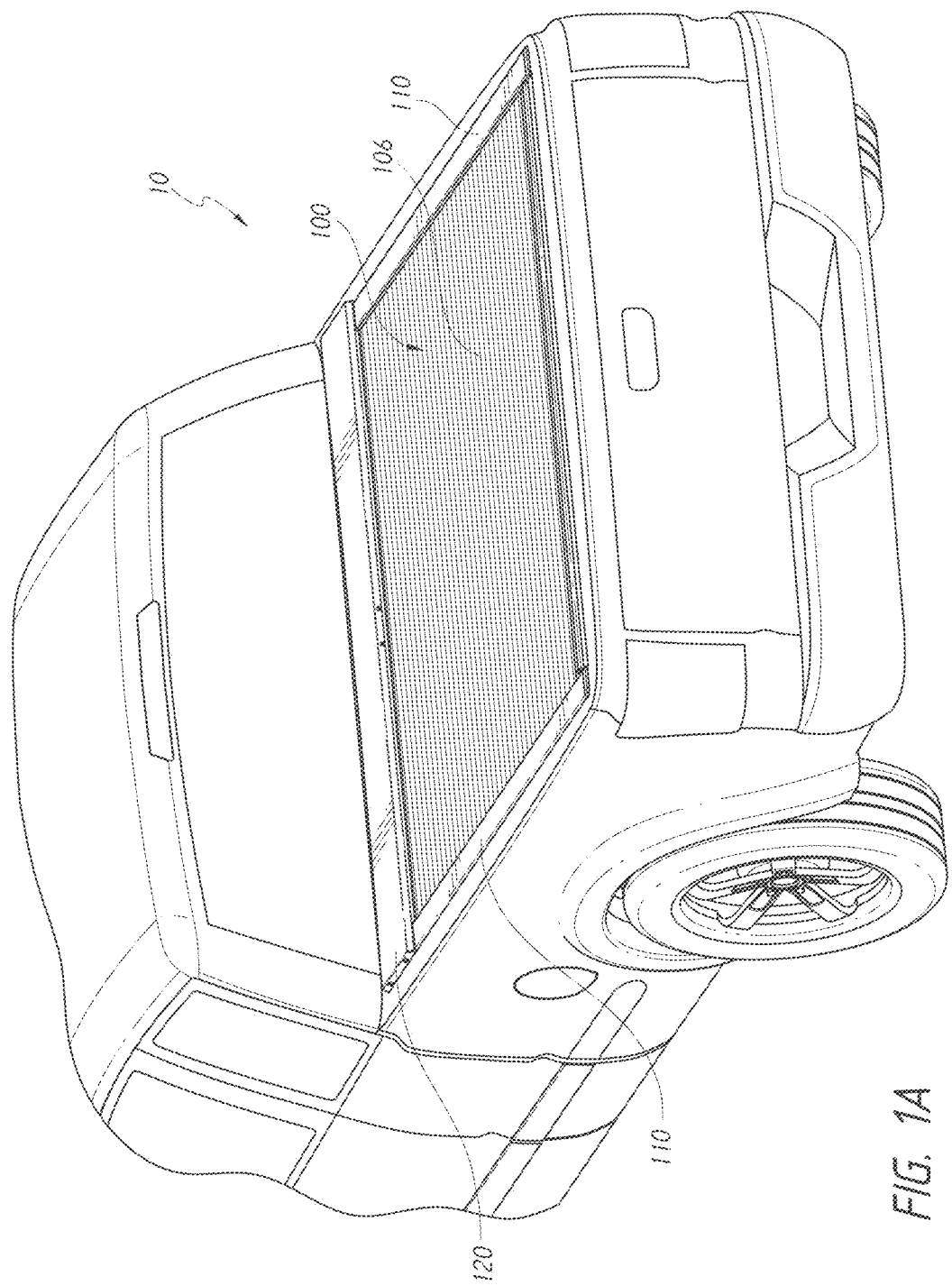
FIG. 1A illustrates an embodiment of a retractable tonneau cover on a vehicle in an extended position.

Disclosed herein are embodiments of a rack assembly configured to mount to sidewalls of a truck bed of a vehicle. Embodiments of the disclosed rack assembly can include mounting brackets that can secure to the sidewalls of the truck bed and secure tracks that carry vertical load. In some embodiments, the tracks comprise one or more mounting locations for mounting cross bars that can support loads from, for example, equipment or other small or large items. The mounting brackets can secure to the tracks, pass through openings in side rails of a tonneau cover assembly, and secure to the sidewalls of the truck bed so that little or no additional vertical load from the tracks and/or cross bars is applied to the side rails. This can be advantageous because the vertical load capacity of side rails of a tonneau cover assembly are often less than that of the sidewalls of the truck, especially given that the side rails may already be utilized to receive and support a retractable tonneau cover (and the load from such tonneau cover). Such configuration can be useful where the side rails are manufactured with openings sized to allow the mounting brackets to pass therethrough or where the side rails are retrofitted with such openings.

Additionally, in some embodiments, the rack assembly disclosed herein does not apply additional vertical load to an installed tonneau cover, which can be advantageous given the limited load capacity of the tonneau cover. At the same time, the rack assembly disclosed herein can advantageously make the space above the tonneau cover usable for storage. Transferring additional load (e.g., from storage or equipment secured to the rack assembly) directly to the sidewalls of the truck bed provides a safer and more efficient method of load distribution, especially given that vehicles having storage rack assemblies can experience significant wind and/or other dynamic loads when the vehicle is traveling at high speeds.

Embodiments of the rack assembly disclosed herein can include one or more mounting locations along the tracks. These mounting locations can support and secure cross bars which can extend across the truck bed and be utilized to secure equipment or other items. Further, these mounting locations can be positioned at various positions along the tracks, and can comprise gliders configured to slide along the tracks. Such gliders can allow virtually an infinite amount of placement of the mounting locations and cross bars mounted thereto, which advantageously gives flexibility in the storage capacity and configuration of the rack assembly. In some embodiments, the gliders have side arms which can restrict movement of the gliders with respect to the tracks in a given direction, thus aiding securement of the gliders to the tracks. In some embodiments, the gliders have a through-hole on a top portion which can allow a fastener to pass or thread therethrough into a recess extending along the tracks. Such configuration can allow the gliders to secure to the tracks in desirable positions.

While the following disclosure contains particularities to a hard tonneau cover, the disclosure is not so limited and can be used with a retractable soft tonneau cover as well.

Figure 1B:
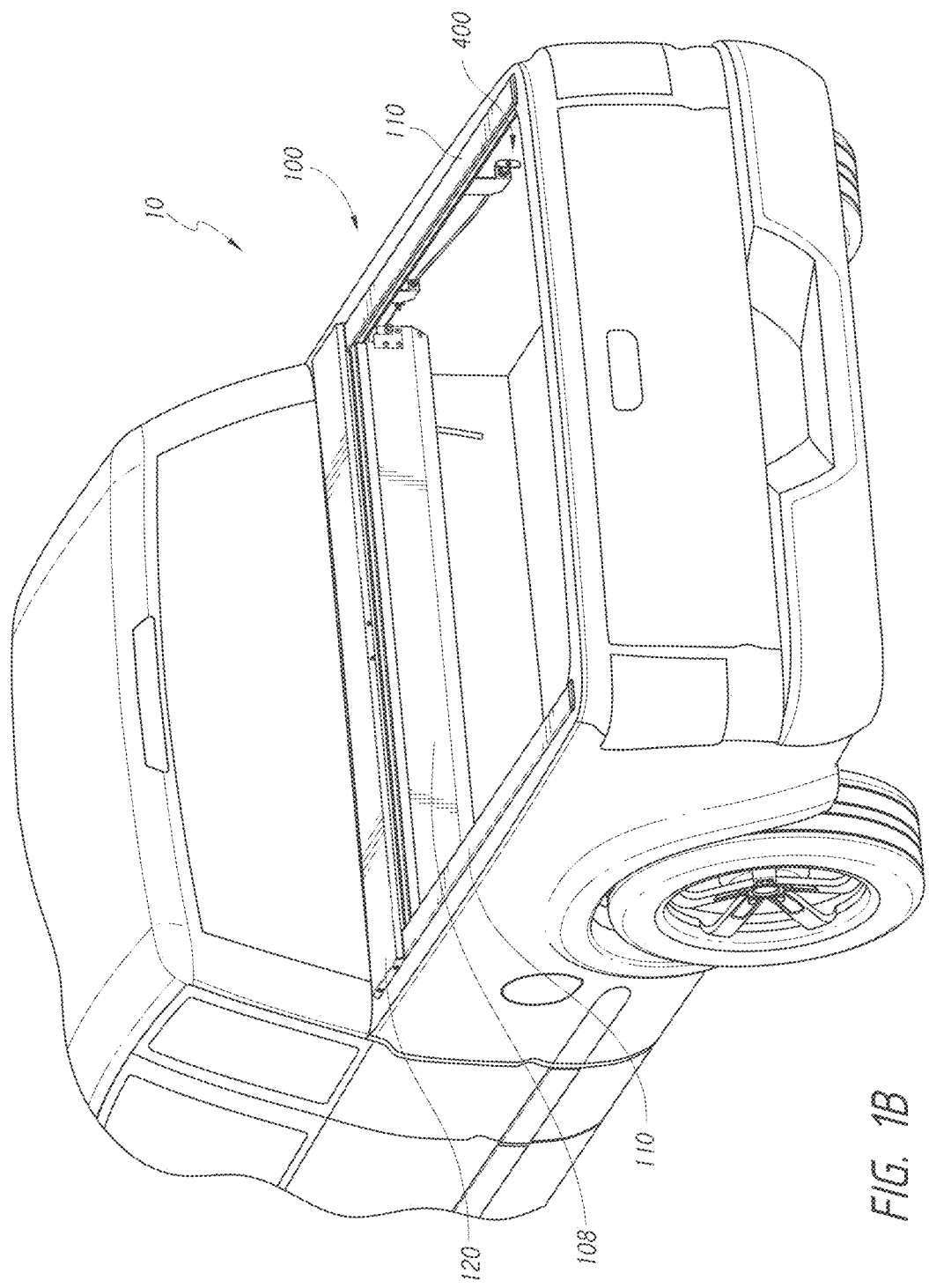
FIG. 1B illustrates an embodiment of a retractable tonneau cover on a vehicle in a retracted position.

FIG. 1A illustrates an embodiment of a tonneau cover 100 on a vehicle 10 in an extended position, thereby covering the cargo bed (or truck bed), where FIG. 1B illustrates an embodiment of the tonneau cover 100 on a vehicle 10 in a retracted position, thereby exposing the cargo bed.

FIG. 2 shows an embodiment of a tonneau cover 100 in a fully extended position from a perspective view, and FIG. 3 shows the tonneau cover 100 from a side view. While a vehicle 10 has been removed, it will be understood that the tonneau cover 100 could be used to cover all or a portion of a vehicle, such as a cargo bed of a truck. This tonneau cover 100 can be incorporated into other vehicles as well, and the particular vehicle type does not limit the disclosure.

As shown, the tonneau cover 100 can be formed from a number of connected slats 106 that can be translated into a housing 108 near a cab end 102 (the retracted position), thus allowing a user to access a cargo bed of the vehicle 10, and can be translated out to the tailgate end 104 to cover the cargo bed of the vehicle 10 (the extended position), thus preventing access into the cargo bed. The slats 106 can be resilient, thus making the tonneau cover 100 a hard tonneau cover. Each of the slats 106 can extend between two side rails (or tracks) 110 and follow along a slot in the side rails 110 to extend across a width of the cargo bed. Thus, the slats 106 can slide within the side rails 110 between the retracted and extended positions of the tonneau cover 100. The side rails 110 can be attached to the vehicle, such as on the cargo bed and/or on sidewalls of the cargo bed, to allow the tonneau cover to properly cover the cargo bed. Side rails 110 can be attached by screws, bolts, rivets, adhesives, etc. and the particular attachment does not limit the disclosure. The side rails 110 can extend along a length of the cargo bed.

Accordingly, in the extended position the tonneau cover 100 can extend between the cab and the tailgate of a vehicle 10, and across the width of the cargo bed, and can completely prevent access to the cargo bed of the vehicle 10. In some embodiments, the tonneau cover 100 can include a lock at the tailgate end 104 which can attach the tonneau cover 100 to a tailgate.

In some embodiments, the slats 106 can be metallic slats (e.g., aluminum, steel, alloy), though the particular metal does not limit the disclosure. The plurality of slats 106 can be flexibly connected to one another allowing for some bending between adjacent slats 106. In some embodiments, a hinge 107 may be used to attach adjacent slats 106 (shown in FIG. 4A). In some embodiments, a living hinge may be used. In some embodiments, a silicon living hinge can be used.

In some embodiments, the slats 106 may be covered by another material, such as vinyl. However, in some embodiments the slats do not contain another material and can be exposed. In some embodiments, the slats 106 are not covered by vinyl. Exposed slats 106 can be advantageous as covering material, such as vinyl, can crease/bunch when the tonneau cover 100 is moving between the extended and the retracted position, stopping movement of the tonneau cover 100 and requiring user maintenance.

Figure 4A:
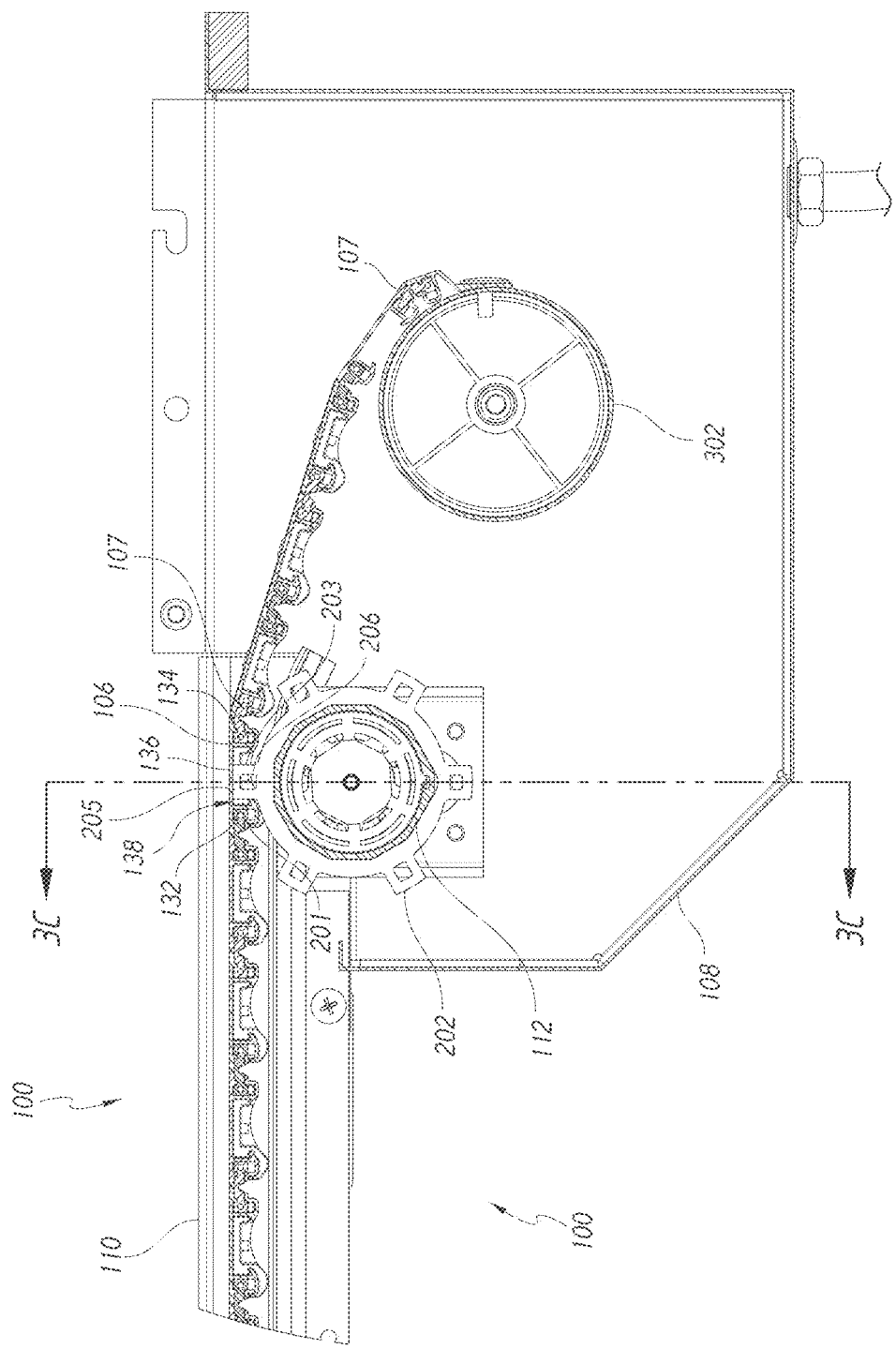
Figure 4C:
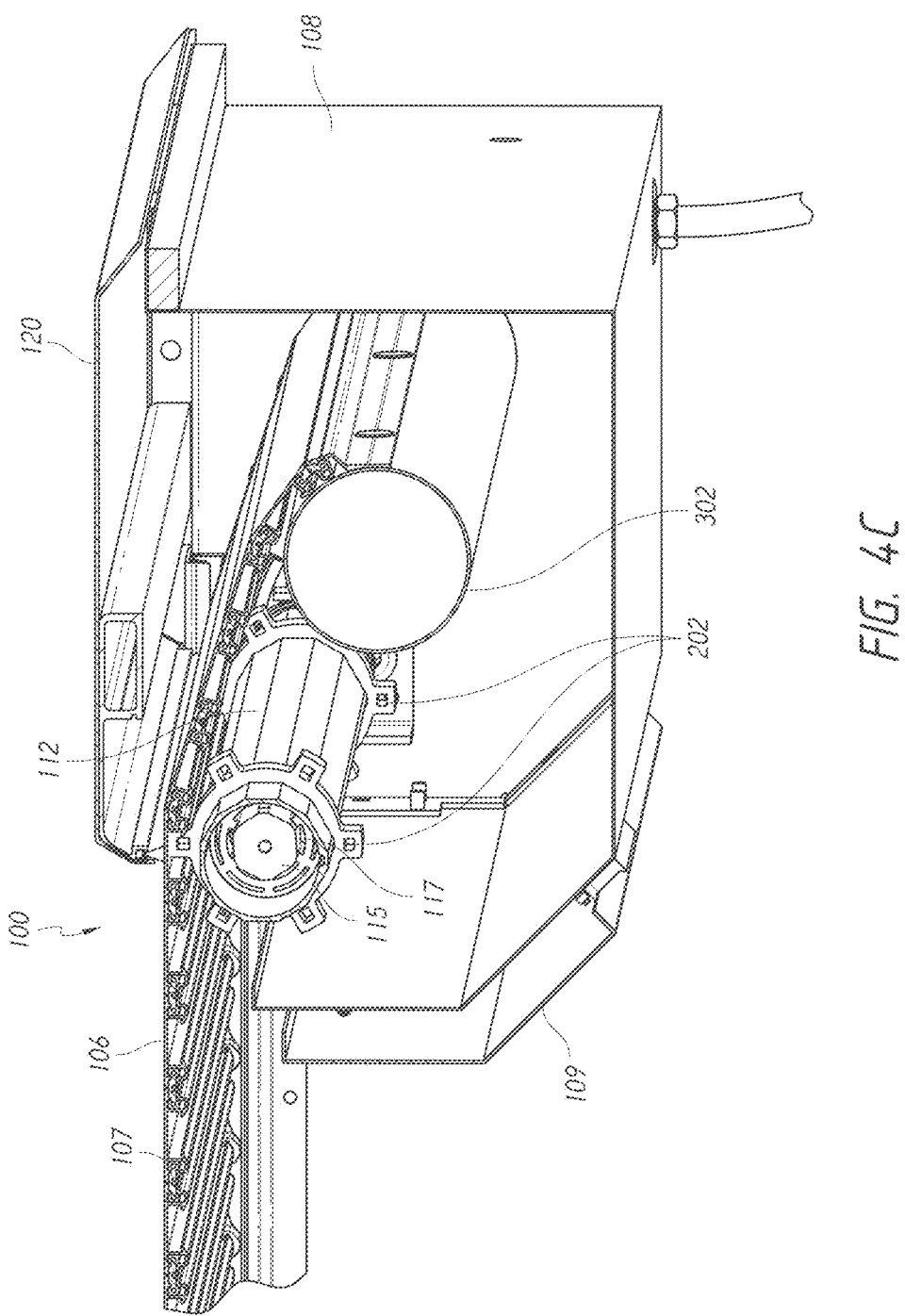

FIGS. 4A-4C illustrate a side view of the tonneau cover 100 with a portion of the housing 108 partially removed to better describe the internal components held within the housing 108. As shown, an outer surface of a circular drive cog 202, in particular protrusion 206, interacts with an underside surface of the slats 106 of the tonneau cover 100. In some embodiments, each of the slats 106 can include a first end wall 132 spaced from a second end wall 134 by a connecting wall 136 to define a slot 138 for receiving a portion of the circular drive cog 202, in particular the protrusion 206 of the cog 202. As shown in FIG. 4A, a first surface 201 of the protrusion 206 of the cog 202 can apply a force against the first end wall 132 when rotating counterclockwise to drive the tonneau cover 100 towards the extended position. If used to retract the tonneau cover 100, the second surface 203 of the protrusion 206 can apply a force on the second end wall 134 when rotating clockwise in FIG. 4A to retract the tonneau cover 100. The top surface 205 of the protrusion 206 can abut against the connecting wall 136. Thus, as the circular drive cog 202 turns, the slats 106 can translate along the side rails 110, into and out of the housing 108. In some embodiments, the slot 138 can be larger than the circular drive cog 202 portion, and thus there is some area for the protrusion 206 to move within the slot 138. In some embodiments, not every slat 106 contains a slot 138, which may allow for larger sided cogs (and/or protrusions 206) to be used.

As shown in FIGS. 4B-4C, the circular drive cog 202 can surround a motor drive reel (or motor reel, drive reel) 112 on an internal surface, which in turn houses a motor 115 (or motor drive), such as a tubular motor. Thus, the motor 115 can rotate motor coupler 117 within the motor drive reel 112, and the coupler 117 can engage or disengage with the motor drive reel 112 and or the motor 115 can engage or disengage with the coupler 117. The motor drive reel 112 can extend a width of the housing 108 and be attached to the housing 108, such as through brackets 113. The circular drive cog 202 can fit on the motor drive reel 112 so that as the motor drive reel 112 rotates by rotation of the motor 115, the circular drive cog 202 would rotate as well, thereby translating the tonneau cover 100 as discussed above.

In some embodiments, the motor drive reel 112 is configured to be powered in only one direction. For example, it can be configured to push the tonneau cover 100 from the retracted to the extended position by rotating counterclockwise in the view of FIG. 4A. In some embodiments, the motor drive reel 112 can operate in both directions to open and close the tonneau cover 100 such as in a clockwise and counterclockwise as shown in FIG. 4A.

In some embodiments, two circular drive cogs 202 can be used, each attached on opposite ends of the motor drive reel 112. In some embodiments, three circular drive cogs 202 can be used, each attached on opposite ends of the motor drive reel 112 and one generally in the middle. A clear view of the three cogs 202 can be seen in FIG. 6 and FIG. 7B. The same motor 115 and motor drive reel 112 can rotate the cogs 102 simultaneously. In some embodiments, two motors and/or two motor drive reels can be used to drive the circular cogs 102 separately.

Continuing, the cab end 102 of the tonneau cover 110 can be attached to a spring reel 302, containing a spring, also contained within the housing 108. The spring reel 302 can generally extend the width of the tonneau cover 100 and can be contained within the housing 108. The spring reel 302 can be attached to different sides of the housing 108 at opposite ends of the spring reel 302, such as through brackets. The slats 106 of tonneau cover 100 can wrap around (e.g., roll up on) the spring reel 302 as the tonneau cover 100 is retracted into the housing 108. In some embodiments, the cab end 102 of the tonneau cover 100 can be attached, such as riveted, screwed, bolted, to an outer surface of the spring reel 302. In some embodiments, the tonneau cover 100 may have one or more slats 106 that are curved 107 to match an outer surface of the spring reel 302.

The spring reel 302 may contain a spring, such as a torsion spring, though the type of spring does not limit the disclosure. The spring is configured to provide a force on the tonneau cover 100 in the direction of retracting the tonneau cover 100 towards the spring reel 302. Thus, in order to retract the tonneau cover 100, the motor 115 can be disengaged from the motor reel 112, allowing the motor reel 112 and circular drive cog 202 to freely spin. The tension of the spring in the spring reel 302 will automatically retract the tonneau cover 100 into the housing 108 until the motor 115 is reengaged with the motor reel 112. Thus, the motor 115 may not exert any force when the tonneau cover 100 is retracting, making the tonneau cover 100 in "a free pull mode". Accordingly, the tonneau cover 100 can be considered spring loaded. When a user wants to extend the tonneau cover 100, the motor 115 can be reengaged and used to push out the tonneau cover 100 into the extended position.

In some embodiments, a spring may not be used and thus the motor 115 can operate the tonneau cover 100 in both directions. In some embodiments, the spring may exert an extending force on the tonneau cover 100 instead of the retracting force discussed above, and the motor 115 may be used to retract the tonneau cover 100. The particular force directionality does not limit the disclosure.

The spring reel 302 can have a diameter of about 1, 1.5, 2, 2.5, 3, 3.5, or 4 inches. The spring reel 302 can have a diameter of greater than about 1, 1.5, 2, 2.5, 3, 3.5, or 4 inches. The spring reel 302 can have a diameter of less than about 1, 1.5, 2, 2.5, 3, 3.5, or 4 inches. The particular dimensions of the spring reel 302 do not limit the disclosure.

In some embodiments, the tonneau cover 100 can be locked at a particular position, such as by engaging the motor 115 with the motor reel 112 but not moving the motor 115 forward. This will allow the tonneau cover 100 to remain in an intermediate position between the retracted and extended position as long as a user desires.

Figure 6:
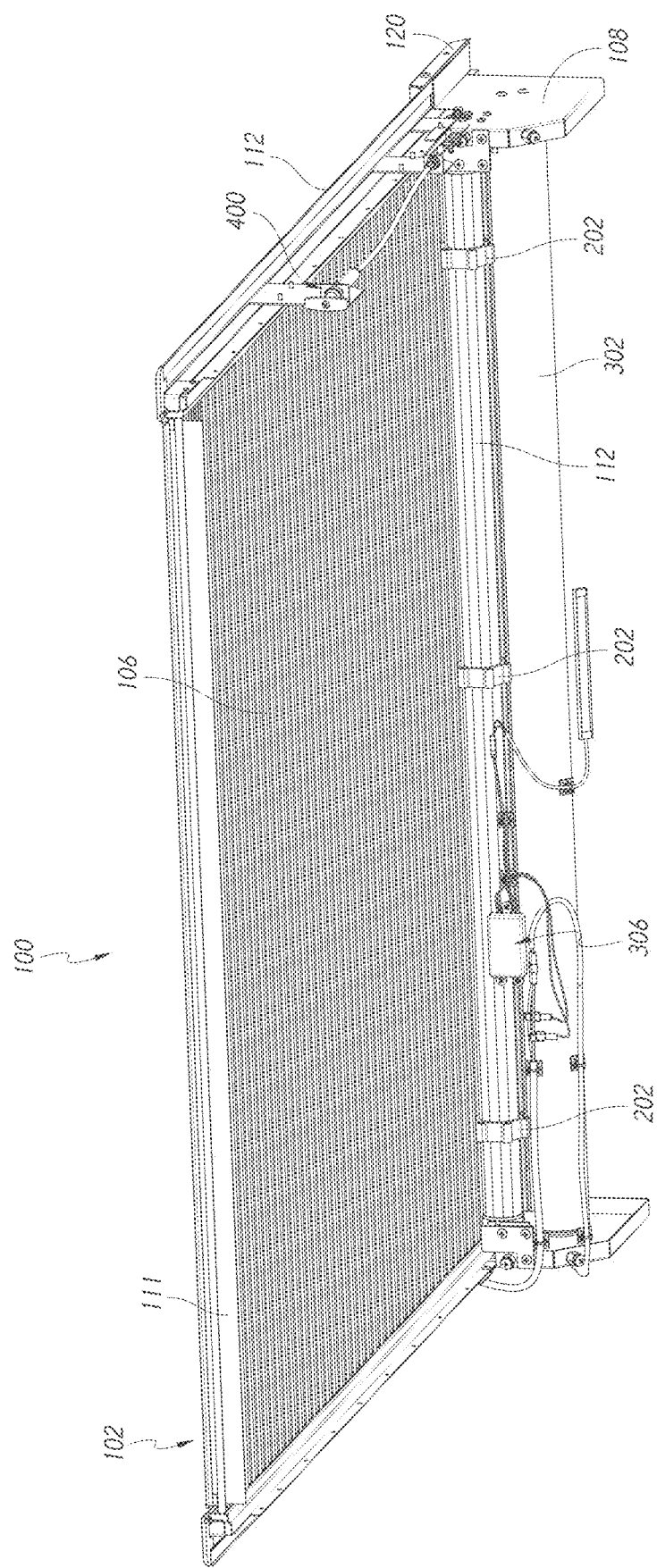
FIG. 6 illustrates a bottom perspective view of a retractable tonneau cover.

FIG. 5 illustrates a front view of the retractable tonneau cover 100 and FIG. 6 shows a perspective underside view of the retractable tonneau cover 100 to more clearly illustrate certain components.

Referring back to FIG. 3, the retractable tonneau cover 100 can have an emergency release 400 which can be incorporated into some embodiments of a tonneau cover 100. In some embodiments, the tonneau cover 100 may not have an emergency release.

As shown, the emergency release 400 can include a handle 402 attached to a cable/wire/cord 404. The cord 404 can be attached into the motor drive reel 112. By activating the emergency release 400, such as by pulling or turning the handle 402, the cord 404 can disengage a spring loaded mechanism in the motor 115, such as a release pin compression spring, releasing it from the motor drive reel 112. Thus, when the emergency release 400 is activated, the motor 115 disengages (or separates) from the motor reel 112 and/or the circular drive cog 202, and can only spin in place. Accordingly, even if the motor 115 continues to turn, it will not move the tonneau cover 100. The emergency release 400 can be connected to the side rail 110 by one or more holders 406 extending downwards from the side rails 110. The emergency release 400 can be bolted, or otherwise connected to the holders 406. In some embodiments, the holders 406 can be thin sheet metal, hooks, etc. In some embodiments, the cable 404 can include a covering extending partially along a length of the cable 404. The emergency release 400 can be located within the cargo bed in some embodiments, such as shown in FIG. 1B, and outside the cargo bed in some embodiments. A user can further deactivate the emergency release 400 when desired to reengage the motor 115.

Figure 7A:
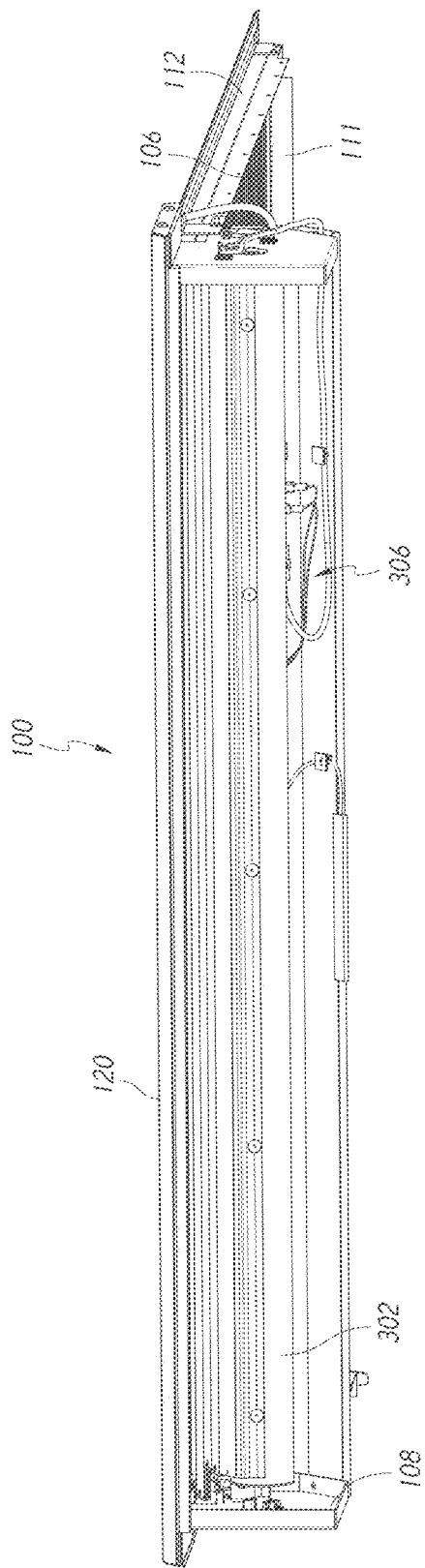
FIGS. 7A-7B illustrates a rear view of a retractable tonneau cover.
Figure 7B:
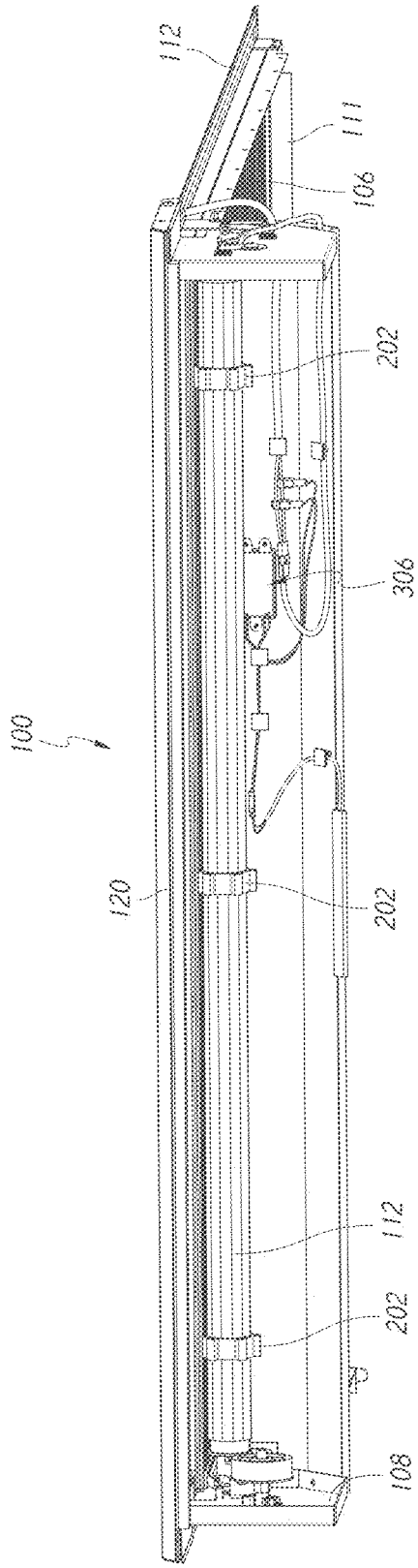

FIGS. 7A-7B illustrate a reverse perspective of the retractable tonneau cover 110 with the back portion of the housing 108 removed, which allows viewing of electronic components 306. FIG. 7B also removes the spring reel 302 for convenience. Specifically, a lid 120 on the top side of the tonneau cover 100 on the cab end 102 can be seen. The lid 120 may be one single piece covering the housing 108 and allowing the tonneau cover 100 to pass under the lid 120 and into the housing 108. The lid 120 can lie on the rails 110 and thus can span a width of the tonneau cover 110.

Previously, electronic components 306 for operating the motor 115 were stored within the lid 120, such as on a tray that is not used in this embodiment. This can create a large and bulky lid 120, which is aesthetically unappealing. Accordingly, embodiments of the disclosure have moved and/or integrated the electronic components 306 from the lid 120 into and/or with the housing 108 and/or into the motor drive reel 112. This allows for the lid 120 to be much more compact, both vertically and horizontally, and more aesthetically pleasing, as well as moving the electronic components 306 under further cover to prevent any damage from the elements.

Thus, in some embodiments the lid 120 can have a height of 0.5, 1, 1.5, 2, 2.5, 3, 3.5, 4, 4.5, or 5 inches. In some embodiments, the lid 120 can have a height of greater than 0.5, 1, 1.5, 2, 2.5, 3, 3.5, 4, 4.5, or 5 inches. In some embodiments, the lid 120 can have a height of less than 0.5, 1, 1.5, 2, 2.5, 3, 3.5, 4, 4.5, or 5 inches.

In some embodiments, the lid 120 can have a length (the direction from the cab to the tailgate) of 5, 6, 7, 8, 9, 10, 11, or 12 inches. In some embodiments, the lid 120 can have a length (the direction from the cab to the tailgate) of greater than 1, 2, 3, 4, 5, 6, 7, 8, 9, 10, 11, or 12 inches. In some embodiments, the lid 120 can have a length (the direction from the cab to the tailgate) of less than 5, 6, 7, 8, 9, 10, 11, or 12 inches. This can be approximately ½, ⅓, or ¼ smaller of a length than previous retractable tonneau covers. In some embodiments, it can be greater than ½, ⅓, or ¼ smaller of a length than previous retractable tonneau covers. In some embodiments, it can be less than ½, ⅓, or ¼ smaller of a length than previous retractable tonneau covers.

As shown in FIGS. 7A-7B, the electronic components 306 have been moved within the housing 108 and can be integrated more closely with the motor drive reel 112. This allows the electronic components 306 to be moved from the lid 120, thereby reducing the size of the lid 120. In some embodiments, the electronic components 302 may connect the motor 115 to electronics within the vehicle 10. In some embodiments, the electronic components 302 may include a battery. The electronic components 302 can include wires connecting the motor 115 to an activation source, which can receive a signal (wireless, Bluetooth, RF, etc.) from a user to operate the motor 115, and thus the tonneau cover 100. The electronic components 302 may be generally contained within a container in the housing 108 and/or motor drive reel 112, or may be free within them.

In some embodiments, the tonneau cover 100 can include a stopper 111 (or stop mechanism or tab) on its tailgate end 104. The stopper 111 can be seen in FIG. 6 among others. The stopper 111 can extend generally downwards from the tailgate end 104. As the tonneau cover 100 is withdrawn through tension of the spring reel 302, the tonneau cover 100 would be completely withdrawn into the housing 108 if left on its own. This would release the tonneau cover 100 from the circular drive cog 202, thereby making the tonneau cover 100 inoperable. Accordingly, it can be advantageous to include the stopper 111 for preventing the tonneau cover 100 from fully entering the housing 108. As the tonneau cover 100 is retracted, the stopper 111 will abut the housing 108 or cargo bumper, preventing any further retraction of the tonneau cover 100 into the housing 108.

The stopper 111 can extend partially or fully along the width of the final slat in the tonneau cover 100. In some embodiments, a plurality of stoppers can be used, adjacent stoppers being spaced apart from one another. In some embodiments, 1, 2, 3, 4, or 5 stoppers can be used. In some embodiments, greater than 1, 2, 3, 4, or 5 stoppers can be used. In some embodiments, less than 2, 3, 4, or 5 stoppers can be used.

The stopper 111 can extend downwards from the slats 106 approximately 0.5, 1, 1.5, 2, 2.5, or 3 inches. The stopper 111 can extend downwards from the slats 106 greater than 0.5, 1, 1.5, 2, 2.5, or 3 inches. The stopper 111 can extend downwards from the slats 106 less than 1, 1.5, 2, 2.5, or 3 inches. In some embodiments, the stopper 111 can be ¹⁄₁₀, ⅛, ⅙, ¼, or ½ inches in thickness. In some embodiments, the stopper 111 can be greater than ¹⁄₁₀, ⅛, ⅙, ¼, or ½ inches in thickness. In some embodiments, the stopper 111 can be less than ¹⁄₁₀, ⅛, ⅙, ¼, or ½ inches in thickness. The particular size of the stopper does not limit the disclosure, and the stopper 111 can be generally sized to abut against a front surface of the housing 108 or the cargo bumper.

While the stopper 111 can be advantageously used to prevent unwanted retraction of the tonneau cover 100 into the housing 108, it can also be used for the initial setting of the motion of the tonneau cover 100. Embodiments of the disclosed tonneau cover 100 can be used for many different lengths of cargo beds. Thus, the stopper 111 can be used to set the retraction/extension limit of the tonneau cover 100 when first installed. The tonneau cover 100 can be installed onto a vehicle and operating in setting to properly extend/retract the tonneau cover 100. For example, the tonneau cover 100 can be pulled into the fully extended position and run until the stopper 111 hits the housing, stopping retraction of the tonneau cover 100. This setting can be saved into the system, thus allowing for the tonneau cover 100 to extend and retract to the proper dimensions. In some embodiments, the housing 108 can include a cargo bumper 109 attached facing into the cargo bed, such as towards the tailgate, shown in FIG. 4C. This bumper 109 can be formed to accept impacts, such as the stopper 111 or cargo in the cargo bed, thus reducing or eliminating damage the housing 108 and/or any internal components.

Figure 8C:
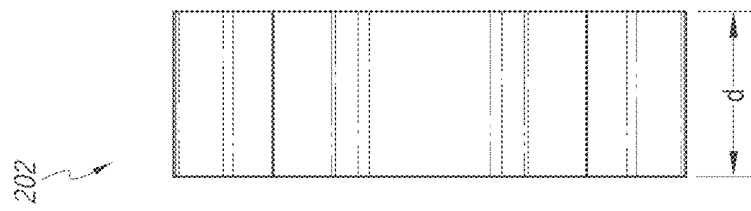
FIGS. 8A-8C illustrate views of a toothed cog that can be used with the retractable tonneau cover.
Figure 8B:
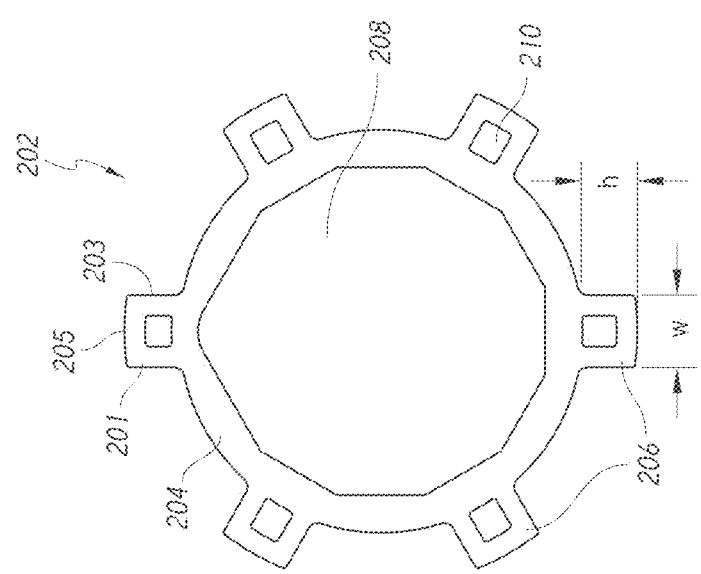
Figure 8A:
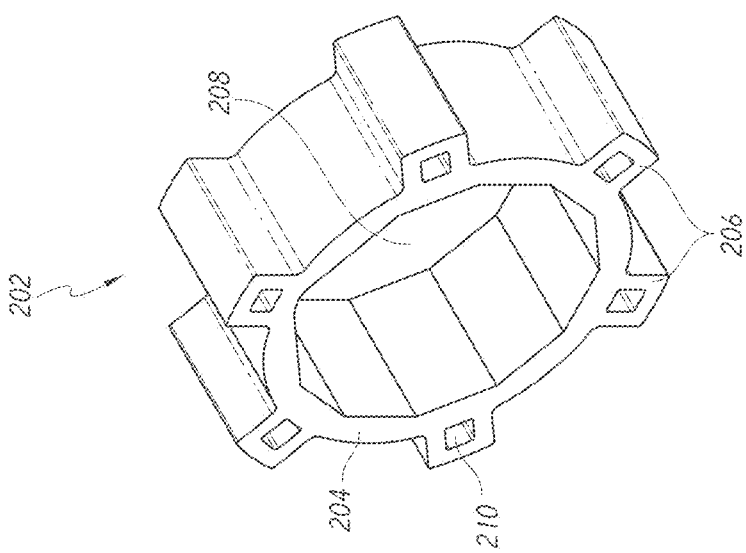

FIGS. 8A-8C illustrate an embodiment of a circular drive cog 202 that can be used to retract and extend the tonneau cover 100. This circular drive cog 202 can be generally smaller than cogs typically used for a retractable tonneau cover, as well as having more teeth and smaller teeth. As shown, the circular drive cog 202 can contain a generally circular body 204 with a number of protrusions (or teeth) 206 extending outwards from the body 204. Each of the protrusions 206 can have a first surface 201, a second surface 203 opposite the first surface, and a top surface 205 connecting the first surface 201 and the second surface 203. The circular drive cog 202 can contain 4, 5, 6, 7, 8, 9, or 10 protrusions. The circular drive cog 202 can contain greater than 4, 5, 6, 7, 8, 9, or 10 protrusions in some embodiments. In some embodiments, the protrusions 206 are equally spaced around the body 204. In some embodiments, the protrusions 206 are spaced around the body 204 unequally. The circular drive cog 202 can contain less than 4, 5, 6, 7, 8, 9, or 10 protrusions in some embodiments. As shown, the body 204 can have an aperture 208 extending through the center, forming the body 204 into a ring shape. The aperture 208 can be sized to fit around the motor drive reel 112 so that the circular drive cog 202 rotates with the motor drive reel 112. Further, the protrusions 206 can each contain an aperture 210 extending through them.

In some embodiments, the radius of the circular drive cog 202 can be between 1 and 2 inches (or between about 1 and about 2 inches). In some embodiments, the radius of the circular drive cog 202 can be greater than 1, 1.1, 1.2, 1.3, 1.4, 1.5, 1.6, 1.6, 1.8, 1.9, or 2.0 inches. In some embodiments, the radius of the circular drive cog 202 can be less than 1, 1.1, 1.2, 1.3, 1.4, 1.5, 1.6, 1.6, 1.8, 1.9, or 2.0 inches. In some embodiments, the circular drive cog 202 can have a depth (shown in FIG. 8B) of between 0.5 and 2 inches (or between about 0.5 and about 2 inches). In some embodiments, the circular drive cog 202 can have a depth "d" (shown in FIG. 8C) of greater than 0.5, 1.0, 1.5, or 2.0 inches. In some embodiments, the circular drive cog 202 can have a width of less than 0.5, 1.0, 1.5, or 2.0 inches.

In some embodiments, the circular drive cog 202 can have a diameter of approximately 1, 1.5, or 2 inches. In some embodiments, the circular drive cog 202 can have a diameter of less than approximately 1.5 or 2 inches. In some embodiments, the circular drive cog 202 can have a diameter of greater than 1, 1.5, or 2 inches. The diameter of the drive cog 202 is the diameter across the internal surface of the body 204 (from inside surface to opposite inside surface), which is also the diameter of the aperture 208. This is smaller than previous cogs, which were approximately 2.5 inches in diameter or greater. In some embodiments, the diameter of the cog 202 from the outer surface of a protrusion 206 to the outer surface of an opposite protrusion 206 may be about 3, 3 and 1/8, 3 and 1/4, or 3 and 1/2 inches. In some embodiments, the diameter of the cog 202 from the outer surface of a protrusion 206 to the outer surface of an opposite protrusion 206 may be greater than about 3, 3 and 1/8, 3 and 1/4, or 3 and 1/2 inches. In some embodiments, the diameter of the cog 202 from the outer surface of a protrusion 206 to the outer surface of an opposite protrusion 206 may be less than about 3, 3 and 1/8, 3 and 1/4, or 3 and 1/2 inches.

In some embodiments, the protrusions 206 can have a width "w" (shown in FIG. 8B) of between 0.25 and 0.75 inches (or between about 0.25 and about 0.75 inches). In some embodiments, the protrusions 206 can have a width of greater than 0.25, 0.5, or 0.75 inches. In some embodiments, the protrusions 206 can have a width of less than 0.25, 0.5, or 0.75 inches. In some embodiments, the protrusions 206 can have a height "h" (shown in FIG. 8B) of between 0.25 and 0.75 inches (or between about 0.25 and about 0.75 inches). In some embodiments, the protrusions 206 can have a height of greater than 0.25, 0.5, or 0.75 inches. In some embodiments, the protrusions 206 can have a height of less than 0.25, 0.5, or 0.75 inches. In some embodiments, the protrusions 206 can have a generally square cross-section when viewed from the width v. height plane, such as shown in FIG. 8B. In some embodiments, the protrusions 206 can have a generally rectangular cross-section. The particular cross-section shape does not limit the disclosure.

As discussed above, the protrusions 206 of the circular drive cog 202 can be generally sized and configured to fit into the underside of the slats of the tonneau cover 100. Thus, rotation of the circular drive cog 202 causes the tonneau cover 100 to linearly translate between the retracted and extended positions. As the circular drive cog 202 can provide an upward force onto the tonneau cover 100, there is the potential that the tonneau cover 100 could jump the circular drive cog 202. Further, the circular drive cog 202 can potentially push the tonneau cover 100 into the underside of the lid 120. Accordingly, embodiments of the disclosure can include engagement 500 pads which can prevent/limit the vertical movement of the tonneau cover 100, thus avoiding the tonneau cover 100 inappropriately moving or stopping.

FIGS. 9A-9C illustrate an embodiment of such an engagement pad 500, with FIG. 4B illustrating its position on the tonneau cover 100. FIG. 9A illustrates a side view of the pad 500, such as shown in FIG. 4B. FIG. 9B illustrates a top view and FIG. 9C illustrates a bottom view. As shown, the engagement pad 500 can have an outward facing surface 502, an inward facing surface 504, a bottom surface 506, and an upper surface 508.

As shown, the upper surface 508 can include a number of indents 510 which can be used to connect the engagement pad 500 to the side rail 110, such as by mating with protrusions in the side rail 110, and prevent unwanted motion of the engagement pad 500. In some embodiments, 1, 2, 3, 4, 5, or 6 indents 510 can be used, though the particular location and number of indents does not limit the disclosure. Further, the bottom surface 506 and upper surface 508 can include an aperture 512 for extending a bolt through the engagement pad 500 to attach to the side rail 110. The bottom surface 506 can include a larger aperture than the top surface 508 in order to retain the head of a bolt. In some embodiments, the engagement pad 500 can alternatively be screwed, adhered, or otherwise connect to the rail 110, and the aperture 512 may not be used in some embodiments. In some embodiments, the bottom surface 506 is flat other than the aperture 512 in order to engage with the slats 106. The bottom surface 506 can be depressed or deformed by the slats 106 during operation.

Further, the inward facing surface 504 can include a step 514. This step 514 can be configured so that a portion of the side rail 110 can rest on the step 514

In some embodiments, the engagement pad 500 can be made of plastic, metal, or rubber. In some embodiments, the engagement pad 500 can be injected molded, though the particular processing methodology does not limit the disclosure.

In some embodiments, the engagement pad 500 can be approximately 3 inches by 0.5 inches by 1/4 inches. As shown, the engagement pad 500 can have a trapezoidal look when viewed from the side, the bottom being narrower than the top. Thus, both sides of the engagement pad 500 can be inclined. The engagement pad 500 can be keyed into the side rail 110. Thus, there can be two engagement pads, one on each side of the width of the tonneau cover 100. More engagement pads can be used along the length of the side rails 110. The engagement pad 500 can put downward pressure onto an upper surface of the tonneau cover 100, thereby preventing unwanted motion. Specifically, the engagement pad 500 can hold down the tonneau cover 100 and prevent it from "jumping" off of the cogs 202.

Figure 10:
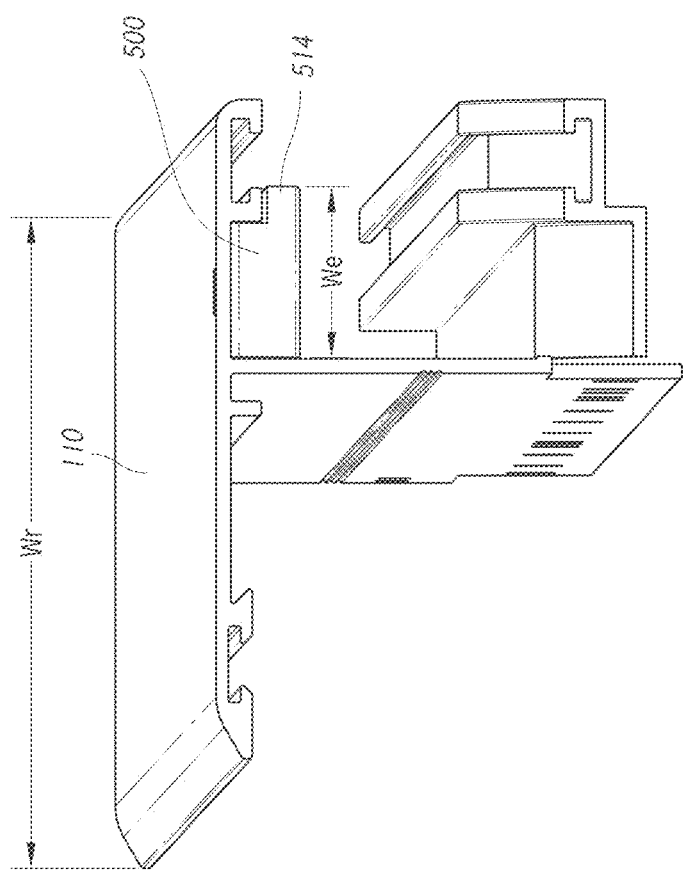
FIG. 10 illustrates an engagement pad in connection with a side rail of a retractable tonneau cover.

FIG. 10 illustrates a side rail 110 and an engagement pad 500 connected to the side rail 110. In some embodiments, the width of the engagement pad 500 (We) can be 1/8, 1/4, 1/2, 3/4, equal to, 1 and 1/4, 1 and 1/2, 1 and 3/4, 2, 2 and 1/2, 3, or 4 times with width of the side rail 110 (Wr). In some embodiments, the width of the engagement pad 500 (We) can be less than 1/8, 1/4, 1/2, 3/4, equal to, 1 and 1/4, 1 and 1/2, 1 and 3/4, 2, 2 and 1/2, 3, or 4 times with width of the side rail 110 (Wr). In some embodiments, the width of the engagement pad 500 (We) can be greater than 1/8, 1/4, 1/2, 3/4, equal to, 1 and 1/4, 1 and 1/2, 1 and 3/4, 2, 2 and 1/2, 3, or 4 times with width of the side rail 110 (Wr). FIG. 11 illustrates a cross-section view when viewed toward the tailgate end 104, which shows the positioning of the engagement pad 500 with respect to other components in the tonneau cover 100. In some embodiments, the engagement pads 500 are only positioned along the respective side rails 110, the engagement pads extend no more than 1/2, 1, 1 1/2 or 2 times the width of the rail 110 and there is only one engagement pad 500 per rail 110.

Embodiments of the tonneau cover 100 can be activated by a user to extend between a retracted and extended position. For example, a user can activate a key fob to operate the motor 115 of the tonneau cover 100, thereby moving it between an extended and retracted position. The key fob can use Bluetooth connection, wireless connection, radiofrequency connection, or any other connection to operate the motor 115. Further, the key fob may be able to stop the tonneau cover 100 at a particular position on the truck bed, e.g., at a partially retracted/partially extended position. In some embodiments, the tonneau cover 100 may be operated by another approach, such as through a smartphone app, a button/switch on the vehicle, a button/switch on the tonneau cover, etc. and the particular device for operating the tonneau cover 100 does not limit the disclosure.

FIGS. 12A-19 illustrate a rack assembly 600 that can be utilized alone or in combination with tonneau covers, such as tonneau cover 100 discussed above with reference to vehicle 10. As discussed herein, the rack assembly 600 can mount to sidewalls of the truck bed of a vehicle (such as vehicle 10) and can transfer additional vertical load directly to the sidewalls as opposed to transferring such additional load to side rails, such as side rails 110 discussed above. Thus, the rack assembly 600 discussed herein can not only make the space above a tonneau cover usable for storage, but also can transfer vertical load in an efficient and safe manner.

Figures 12A, 12B:
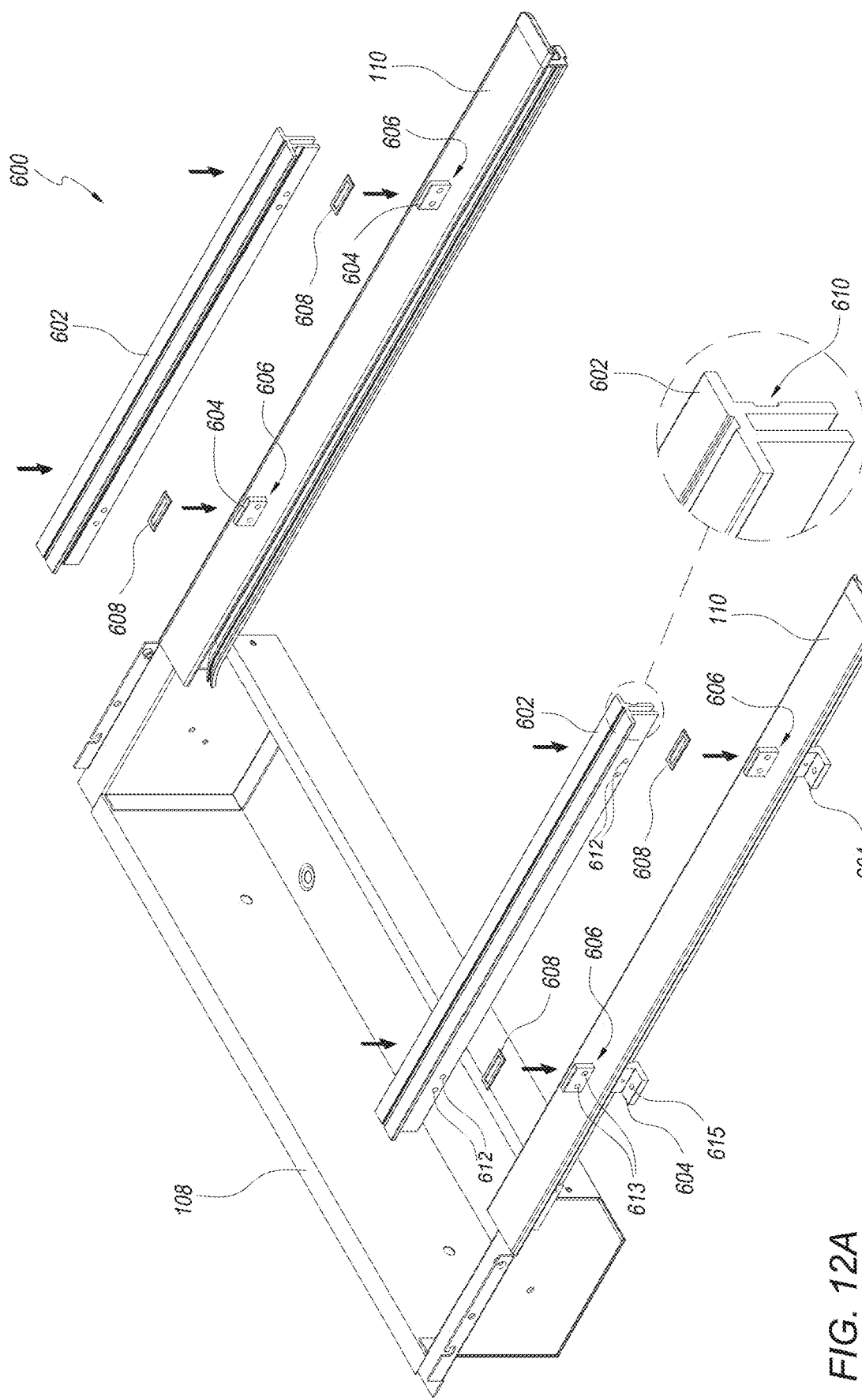

FIGS. 12A-12B illustrate components of a rack assembly 600 which can be secured to a truck bed of a vehicle, such as vehicle 10. The rack assembly 600 can include a plurality of mounting brackets 604 that can secure to sidewalls of the vehicle 10. As discussed above, side rails 110 can be attached to the vehicle (such as to the sidewalls of the truck bed) via bolts, screws, bolts, rivets, adhesives or a combination of these, and/or the side rails can be secured to and/or supported by brackets that can secure to the vehicle 10. The mounting brackets 604 can secure to the sidewalls of the vehicle 10, pass through openings 606 in the side rails 110, and secure to tracks 602. The side rails 110 can be retrofitted to include openings 606 or, alternatively, the side rails 110 can be manufactured with such openings 606. The openings 606 can be sized and/or shaped to allow the mounting brackets 604 or a portion thereof to pass therethrough.

Figure 21C:
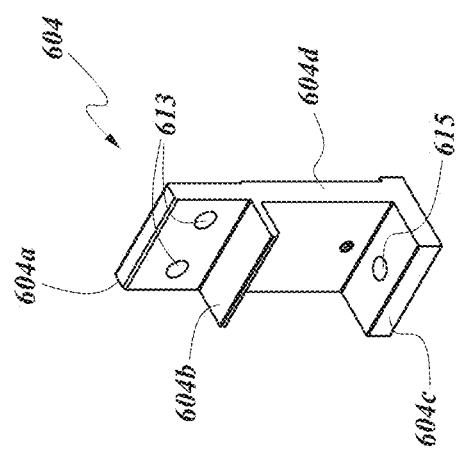
FIG. 21C illustrates a perspective view of an embodiment of the mounting brackets discussed herein.

The mounting brackets 604 can comprise a first portion that secures to the sidewalls of the vehicle 10 and a second portion which secures to the tracks 602. As illustrated in FIGS. 12A-12B, the first portion (which can be a bottom or lower portion 604c) of the mounting brackets 604 can extend laterally outward and/or in a generally perpendicular direction from the second portion and towards the sidewalls of the truck bed. For example, the first portion can be bottom portion 604c of mounting bracket 604 as illustrated in FIG. 21C and the second portion can be a top portion 604a. As also shown in FIG. 21C, the mounting bracket 604 can comprise a stem 604d. The bottom portion 604c can have a length that is shorter than a length of the stem 604d and/or the top portion 604a, especially where the distance between the sidewalls and the side rails 110 is relatively small in comparison with the distance (e.g., vertical distance) that the mounting brackets 604 need to span in order to pass through the side rail openings 606 and secure to the tracks 602. In some embodiments, the bottom portion 604c extends generally perpendicularly from the stem portion 604d and/or the top portion 604a. In some embodiments, the mounting brackets 604 are L-shaped, for example, where mounting bracket 604 comprises a top portion 604a, stem 604d, and a bottom portion 604c. In some embodiments, the mounting bracket 604 comprises stem 604d, top portion 604a, intermediate portion 604b, and bottom portion 604c, and intermediate portion 604b and/or bottom portion 604c are generally perpendicular to stem 604d and/or top portion 604a. In some embodiments, intermediate portion 604b and/or bottom portion 604c extend in a transverse direction from stem 604d. In some embodiments, an end of the top portion 604a comprises one or more through-holes 613 configured to align with one or more through-holes 612 in the tracks 602 (see FIG. 13). The aligning through-holes 612, 613 can be used along with fasteners to secure the top portion 604a of the mounting brackets 604 to the tracks 602. In some embodiments, an end of the bottom portion 604c of the mounting brackets 604 comprises one or more through-holes 615 which can align with holes in a clamp (such as clamp 814) configured to secure the mounting brackets 604 to a sidewall 802 of the truck bed (see FIGS. 21A-21B and discussed below).

As shown in FIGS. 12A-12B, the side rails 110 can include, or be retrofitted to include, openings 606. In some embodiments, the rack assembly 600 includes seals 608. Seals 608 can be placed around the mounting brackets 604 and/or atop the side rails 110 at openings 606. Seals 608 can be sized and/or shaped to fit within a space between a perimeter of the mounting brackets 604 and a perimeter of the openings 606. Additionally or alternatively, seals 608 can be sized and/or shaped to sit above and/or around a space between a perimeter of the mounting brackets 604 and a perimeter of the openings 606. Seals 608 can advantageously prevent water and/or moisture from passing through the such space between a perimeter of the mounting brackets 604 and a perimeter of the openings 606 and/or corroding portions of the mounting brackets 604 and/or the side rails 110. Further, where the rack assembly 600 is used alongside a tonneau cover, such seals 608 can prevent water and/or moisture from entering into an interior space defined between a closed tonneau cover and the truck bed floor. In addition to providing a water and/or moisture seal, seals 608 can also advantageously be used to closed a space between a perimeter of the mounting brackets 604 and a perimeter of the openings 606 and/or help align or position the mounting brackets 604 and the side rails 110 with respect to one another. Desirably, the openings 606 are sufficiently large and the seals 608 and sized and constructed such that the seals 608 form a water-tight seal with the ride rails 110 and the mounting brackets 604, without any significant transfer of load from the mounting brackets 604 to the side rails 110. As used herein "significant load" is a load sufficient to damage the rails or cause the rails flex sufficiently to cause interference (that is, requiring increased force to open or close, or the prevention of opening and closing) with the opening and closing of the cover of the tonneau. Desirably, the load transferred to the side rails 110 by each seal 608 and mounting bracket 604 pair can be less than 30 lbs, 20 lbs, 10 lbs, 5 lbs, 4 lbs, 3 lbs, 2 lbs, 1 lb, 0.5 lb, or 0.25 lb.

As discussed above, the rack assembly 600 can mount to sidewalls of the truck bed of a vehicle and can transfer additional vertical load directly to the sidewalls as opposed to transferring such additional load to side rails discussed above. FIGS. 20A-20E illustrate an example method of securing the rack assembly 600 to the sidewalls of a vehicle using the mounting brackets 604. FIG. 20A illustrates a truck bed of a vehicle having openings 702 in sidewalls 704 of the truck bed. The truck bed can have one or more openings 702 spaced along the sidewalls 704 between a front end of the truck bed and a back end of the truck bed. As shown by FIGS. 20B-20C, supporting brackets 706a, 706b can secure to and/or through openings 702 with bolt 708, such that supporting bracket 706b is secured to an exterior face of the sidewall 704 and supporting bracket 706a is secured to an interior face of the sidewall 704. As shown by FIGS. 20D-20E, supporting bracket 706a can be L-shaped and include two flanges that are generally perpendicular to one another, such that a top flange extends outward from the interior face of the sidewall 704 when the supporting brackets 706a, 706b are secured to the sidewall 704. The top flange of supporting bracket 706a can secure the side rail 110 with the use of a bolt 710. Further, mounting bracket 604 can rest upon and/or secure to supporting bracket 706a so that load from the mounting bracket 604 can be transferred directly through the supporting bracket 706a to the sidewall 704. As discussed above and shown in FIGS. 20D and 20E, mounting bracket 604 can extend through an opening 606 in side rail 110.

As discussed herein, the rack assembly 600 can include one or more tracks 602. For example, the rack assembly 600 can include a pair of elongate tracks 602, each track 602 positioned above side rails 110 and/or above sidewalls of the truck bed. Each track 602 can have a first end, a second end, and a length extending therebetween. Each track 602 can have a length that is a portion of a length of the side rails 110. The length of each track 602 can extend in a direction that is parallel to a length of the side rails 110. In some embodiments, the length of the tracks 602 is at least 10%, 20%, 30%, 40%, 50%, 60%, 70%, 80%, or 90% of the length of the side rails 110. In some embodiments, the length of the track 602 is no more than 90%, 80%, 70%, 60%, 50%, 40%, 30%, 20%, or 10% of the length of the side rails 110. In some embodiments, the length of the track 602 may be between 10% and 90% of the length of the side rails 110, between 30% and 70% of the length of the side rails 110, or between 70% and 100% of the length of the side rails 110. The length of the tracks 602 can be varied depending on the desired variability in arrangement of the rack assembly 600. As discussed below, the tracks 602 can comprise one or more mounting locations that can be used to mount cross bars which can extend across the truck bed. Additionally, as discussed below, the mounting locations of the tracks 602 can be movable and/or translatable along the tracks 602. Where it is desirable to have a wide range of flexibility in the placement of the mounting locations along the tracks 602, more spacing between cross bars, and/or more cross bars, the tracks 602 can have a length that is closer to the length of the side rails 110. However, where it is desired to have less flexibility (for example, where the rack assembly 600 is desired to be utilized in only a portion of the vertical space above a truck bed), the length of the tracks 602 can be made shorter. Thus, the rack assembly 600 can be advantageously customized to obtain various desirable features.

Figure 13:
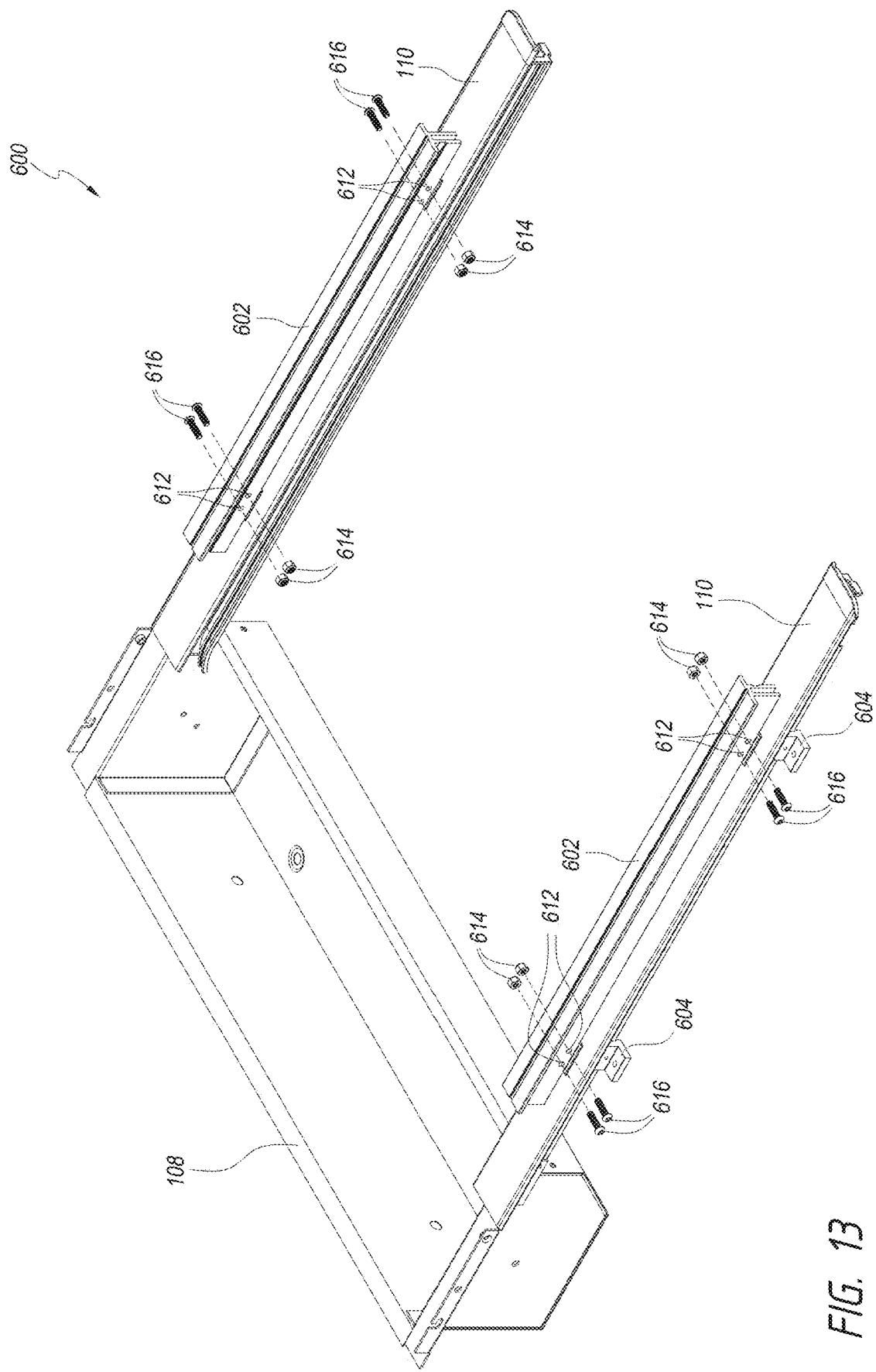

The tracks 602 can extend above and/or along a portion of the side rails 110. As discussed above, the tracks 602 can secure to mounting brackets 604 (e.g., a top portion 604a of the mounting brackets 604). In some embodiments and as illustrated in FIGS. 14A-14B, the tracks 602 can be generally T-shaped with a top portion 603 and a bottom portion 605, wherein the bottom portion 605 is configured to secure to the mounting brackets 604. The top portion 603 of the tracks 602 can be a top flange, which can be substantially horizontal. The bottom portion 605 of the tracks 602 can comprise one or more stems that extend from the top portion 603 of the tracks 602. In some embodiments, the one or more stems extend generally perpendicular to the top portion/flange 603 of the tracks 602. In some embodiments, the bottom portion 605 of the tracks 602 comprises two stems, wherein both stems extend from the top flange of the tracks 602 and are spaced from each other. The space between both stems of the bottom portion 605 of the tracks 602 can be sized and/or shaped to receive a portion of the mounting brackets 604 (e.g., top portion 604a of the mounting brackets 604). For example, as shown by FIGS. 12A-13, an end of the mounting brackets 604 (such as top portion 604a) can fit within the space between the two stems of the bottom portion 605 of the tracks 602 when the tracks 602 are secured to the mounting brackets 604. Such "sandwiching" of the mounting brackets 604 between the two stems of the tracks 602 provides robust securement of the tracks 602. For example, such securement allows the tracks 602 to resist rocking and/or other forces, especially when the rack assembly 600 is assembled on the truck bed of a vehicle and the vehicle is in motion.

As also discussed above, the mounting brackets 604 and the tracks 602 can have corresponding through-holes 612, 613 that allow fasteners to pass therethrough and help secure the mounting brackets 604 and tracks 602 together. In some embodiments, the fasteners comprise bolts 616 and nuts 614, wherein the bolts 616 pass through aligning through-holes 612, 613 in the tracks 602 and mounting brackets 604 and secure with nuts 614 which, when threaded along a threaded portion of bolts 616, contact and/or apply pressure to surfaces of the bottom portion 605 of the tracks 602 (such as surfaces of one of the two stems of the bottom portion of the tracks 602). Such configuration of through-holes 612, 613 and fasteners 616 allow the tracks 602 to transfer load to the mounting brackets 604, such as vertical loads from the cross bars (discussed below). Such loads can then be safely and efficiently transferred from the mounting brackets 604 to the sidewalls of the vehicle.

Advantageously, when the tracks 602 are secured to the mounting brackets 604, the tracks 602 can be positioned and/or mounted above the side rails 110 so that vertical load from the tracks 602 is not transferred to the side rails 110. As discussed herein, the tracks 602 of the rack assembly 600 can receive vertical load from one or more cross bars (such as cross bars 640 discussed below). Such vertical load can be significant, depending on the use of the rack assembly 600 and the equipment secured to the cross bars. As opposed to relying on the strength capacity of the side rails 110, a tonneau cover installed within the side rails 110, or top flanges of sidewalls of the vehicle, the rack assembly 600 allows load from the cross bars to be transferred through the tracks 602 and directly to the sidewalls of the truck bed of the vehicle, via the mounting brackets 604. Including a gap 607 between a bottom surface of the tracks 602 and a top surface of the side rails 110 when the tracks 602 are secured to the mounting brackets 604 can ensure that the tracks 602 do not transfer vertical load to the side rails 110 (by resting thereon) (see FIG. 14A). The gap 607 between the bottom surface of the tracks 602 and the top surface of the side rails 110 can be, for example, no more than 0.1 inch, no more than 0.2 inch, no more than 0.3 inch, no more than 0.4 inch, no more than 0.5 inch, or no more than 0.6 inch. In some embodiments, the gap 607 can be between 0.1 inch and 1 inch, between 0.2 inch and 0.8 inch, between 0.4 inch and 2 inch, between 0.1 inch and 0.5 inch, or between 0.1 inch and 0.25 inch. In some embodiments, the mounting brackets 604 are able to transfer up to 350 lbs of vertical load from the tracks 602 to the sidewalls of the vehicle. Desirably, this transfer of load from the tracks 602 to the sidewalls of the vehicle occurs without the transfer of significant load to the side rails 110.

Figure 14:
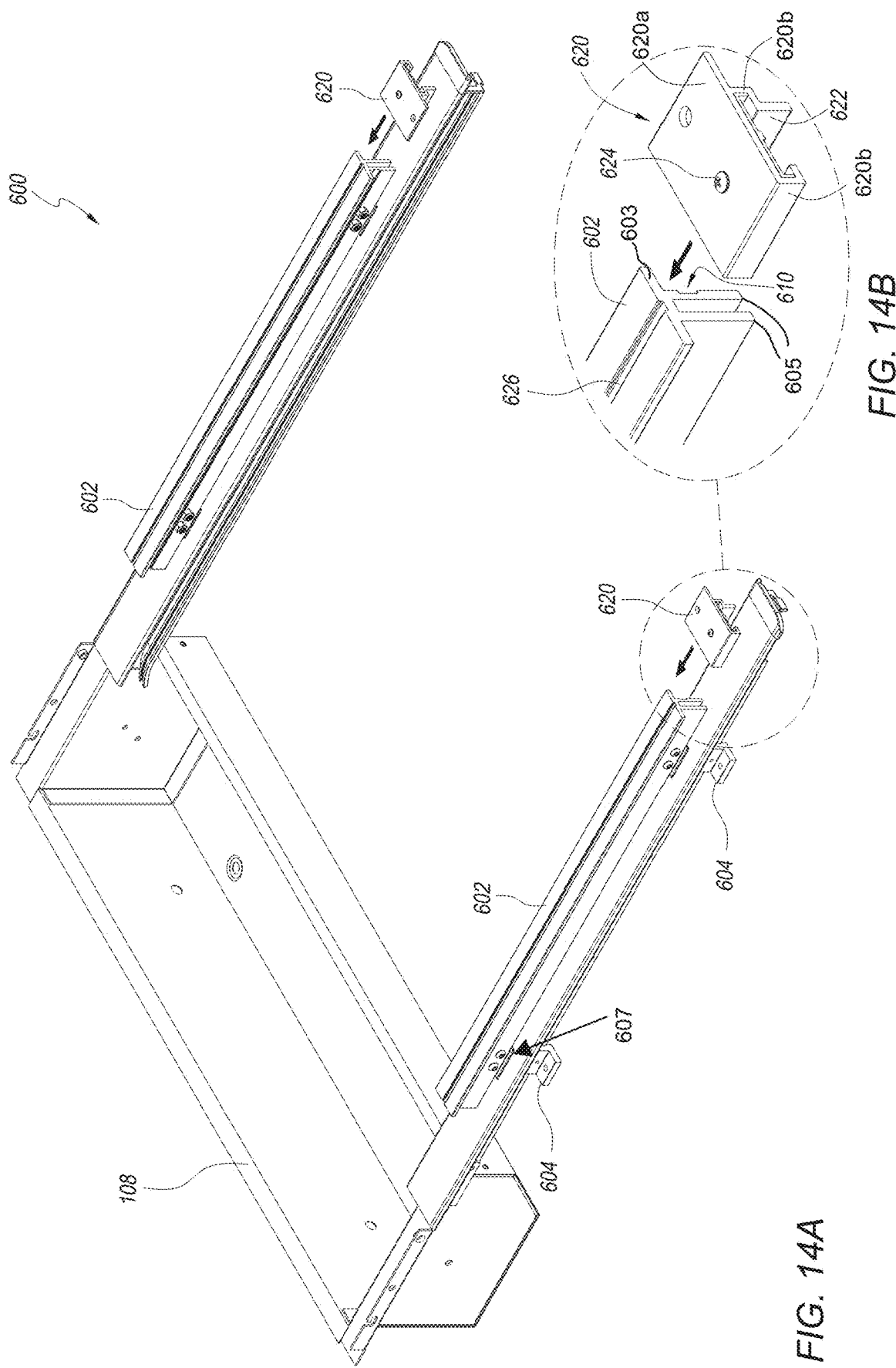
Figure 15:
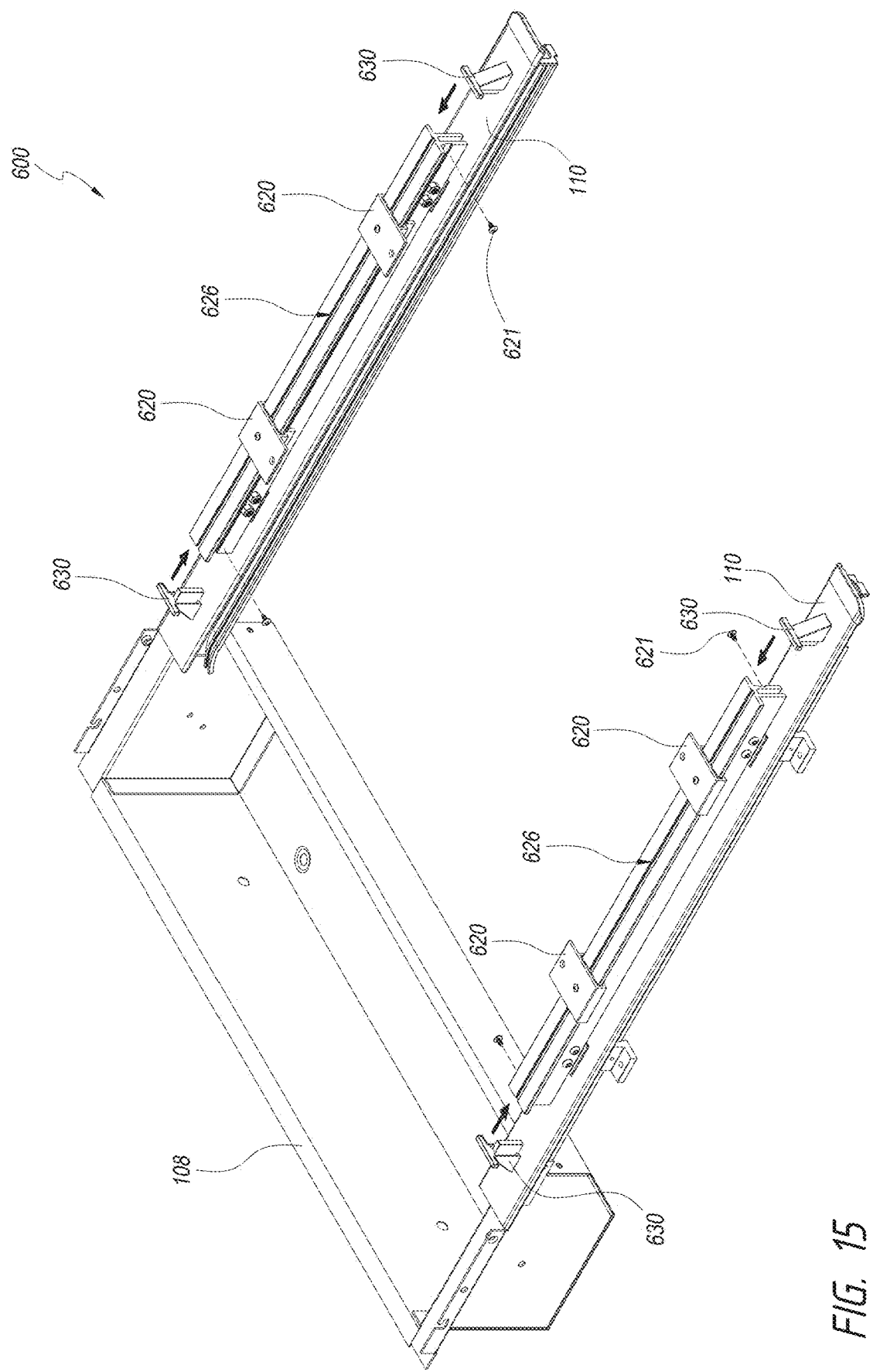

As discussed herein, the tracks 602 can comprise one or more mounting locations configured to facilitate mounting of, for example, cross bars, to the tracks 602. The mounting locations can be positioned along the length of the tracks 602. In some embodiments, the mounting locations comprise gliders 620 configured to secure to and slide along the tracks 602. FIGS. 14A-15, among others, show gliders 620. Glider 620 can comprise a substantially horizontal top portion 620a (also refereed to herein as "top flange 620a") and side arms 620b which can extend laterally from the top portion (see FIG. 14). The side arms 620b can extend generally perpendicular to the top portion 620a in a downward direction and generally parallel to sides of the top portion 620a of the tracks 602. The side arms 620b can additionally extend and/or wrap around the top flange 620*a* of the tracks 602. Such configuration of the side arms 620*b* can help restrict movement of the glider 620 with respect to the tracks 602 in a direction generally perpendicular to an axis extending from a first end of the tracks 602 to a second end of the tracks 602. This can be advantageous because the gliders 620 can experience a combination of vertical and horizontal (lateral) forces when the rack assembly 600 is loaded and/or when the vehicle is moving, and such configuration of side arms 620*b* of the glider 620 can help prevent the gliders 620 from sliding off the tracks 602 in a direction generally perpendicular to a longitudinal axis running through the tracks 602.

In some embodiments, the gliders 620 include a stem 622 extending downward from one or both side arms 620*b*. The stem 622 can be positioned along a side of the bottom portion 605 of the track 602 when the glider 620 is mounted to the track 602. The stem 622 can also prevent rocking and/or lateral movement of the glider 620 with respect to the track 602 similar to the side arms 620*b* of the glider 620.

In some embodiments, the tracks 602 comprise a recess 626 extending along a portion of the tracks 602 (see FIG. 15). The recess 626 can extend along a portion of the track 602 and can be continuous, or alternatively, non-continuous. In some embodiments, the glider 620 comprises a top portion 620*a* having a through-hole configured to align with the recess 626 of the track 602 when the glider 620 is mounted to the track 602. The through-hole of the top portion 620*a* of the glider 620 can be sized to allow a fastener 624 to pass therethrough and contact the recess 626 (see FIG. 14B). By threading the fastener 624 through the through-hole of the top portion of the glider 620 to contact the recess 626, movement and/or sliding of the glider 620 along the track 620 can be prevented or minimized, which can be advantageous if it is desired to fix the glider 620 in place along the track 602 and/or lessen the glider's ability to slide. The recess 626 can extend along the entirety of track 602, which can advantageously allow the glider's movement along the track 602 to be hindered or prevented along any portion of the length of the track 620 via utilization of fastener 624 as described above. While FIG. 14A shows the recess 626 extending along the entire length of the track, in some embodiments, the recess 626 is non-continuous and/or does not extend the entirety of the length of the track 602. For example, recess 626 can be positioned at non-continuous segments along the track 602, which can be advantageous if it is desired to limit the ability of a glider 620 to move along the track 602 when the fastener 624 threaded through the through-hole in the glider 620. In such situations, when the fastener 624 is threaded through the through-hole of the glider 620 and into a non-continuous segment of recess 626, the glider 620 can be prevented from sliding outside such segment because the fastener 624 will but up against ends of the non-continuous recess 626.

As shown in FIGS. 15-19, the rack assembly 600 can include one or more end caps 630 to prevent the gliders 620 from sliding off the tracks 602. In some embodiments, the end caps 630 comprise a base configured to secure to an end of the track 602 and a top piece configured to extend above a surface of the track 602. As shown in FIG. 15, a portion of the end caps 630 can protrude outward from the base and can be sized and/or shaped to fit within two stems of the tracks 602. Such protruding portion of the base of the end caps 630 can be secured between the two stems of the tracks 602 and can be friction fit between the stems. Alternatively or additionally, the protruding portion can be secured to the two stems with a fastener 621 which can extend through corresponding and aligning through-holes in one or both of the two stems of the tracks 602 and the protruding portion of the based of the end caps 630 (see FIG. 15). The top piece of the end caps 630 can extend above a surface of the tracks 602 and can prevent the gliders 620 from sliding off the tracks 620. However, in some embodiments, the top piece does not extend above a surface of the tracks 620. Even where the top piece does not extend above a surface of the tracks 602, the top piece can prevent the gliders 620 from sliding off the tracks 602. For example, where the recess 626 of the tracks extends along the tracks near the ends and a fastener 624 is threaded at least partially into a space defined by the recess 626, when the glider 620 is moved to an end of the track 602, the fasteners 624 can contact and/or bump into the top piece of the end cap 630 and thereby prevent the glider 620 from moving past the top piece of the end cap 630.

In some embodiments, the tracks 602 comprise a groove 610 extending along a length of the bottom portion of the tracks 602 (see FIGS. 14A-14B). For example, the tracks 602 can comprise a groove 610 that extends along a portion of one of the two stems of the bottom portion of the tracks 602. The fastener 621 (see FIG. 15) used to secure the end caps 630 to ends of the tracks 602 can be placed through through-holes in the stem of the tracks 602 so that, when secured therein, a head of the fastener 621 sits within the groove 610. This can advantageously allow the glider 620 and/or portions thereof (e.g., stem 622) to slide along and/or adjacent to the tracks 602 or portions thereof (e.g., adjacent to the groove 610 of the inner stem of the tracks 602) without interfering and/or contacting the fasteners 621 (see FIGS. 14A-15).

In some embodiments, the base of the end caps 630 comprises a triangle-shaped body (see, e.g., FIG. 15). Such triangle-shaped body can be oriented such that a hypotenuse side of the triangle extends from the top piece of the end cap 630 to an end of the end caps 630 that contacts the side rails 110 when in use. Such shape and orientation of the base of the end caps 630 provides strong overturning resistance of the end cap 630 while utilizing minimal amount of material. For example, as discussed above, the gliders 620 can be prevented from sliding off the tracks 602 by the top piece of the end caps 630. The forces applied to the top piece of the end caps 630 when the glider contacts and/or bumps into the top piece can result in overturning of the end cap 630. The triangle-shaped base of the end cap 630, and more particularly the bottom side of the triangle which extends away from the track 602, allows such glider-induced forces and/or overturning moment to be resisted. At the same time, because of the triangle-shape of the base of the end cap 630, the amount of material required to be used in the end caps 630 is reduced.

As discussed above, the rack assembly 600 can include one or more cross bars 640 which can extend across the truck bed of a vehicle and can transfer load to the one or more mounting locations (such as gliders 620) of the tracks 602. FIGS. 16A-19 illustrate the one or more cross bars 640. The cross bars 640 can comprise various cross-sectional shapes, such as square, circle, rectangle, triangle, scalene, among others. The cross bars 640 can be hollow. In some embodiments, such as is illustrated in FIGS. 16A-19, the cross bars 640 comprise a partially trapeze cross-section, wherein a top flange of the cross bars 640 is smaller than a bottom flange. In some embodiments, the cross-section of the cross bars 640 comprises a recess 623 extending inward from a bottom flange towards a center of the cross-section. Such recess 623 can be symmetrically positioned within the cross-section with respect to the bottom flange of the cross-section. Such recess 623 can advantageously provide space for one or more fastener heads to fit within, without interfering with the placement and/or securement of the cross bars 640 on or to the mounting locations of the tracks 602. For example, such recess 623 can allow a head of the fastener 624 (that threads through the through-hole in the top portion 620a of the glider 620 and contacts recess 626 of track 602) to fit therewithin so that the bottom flange of the cross bars 640 can sit flush atop the gliders 620.

Figure 16:
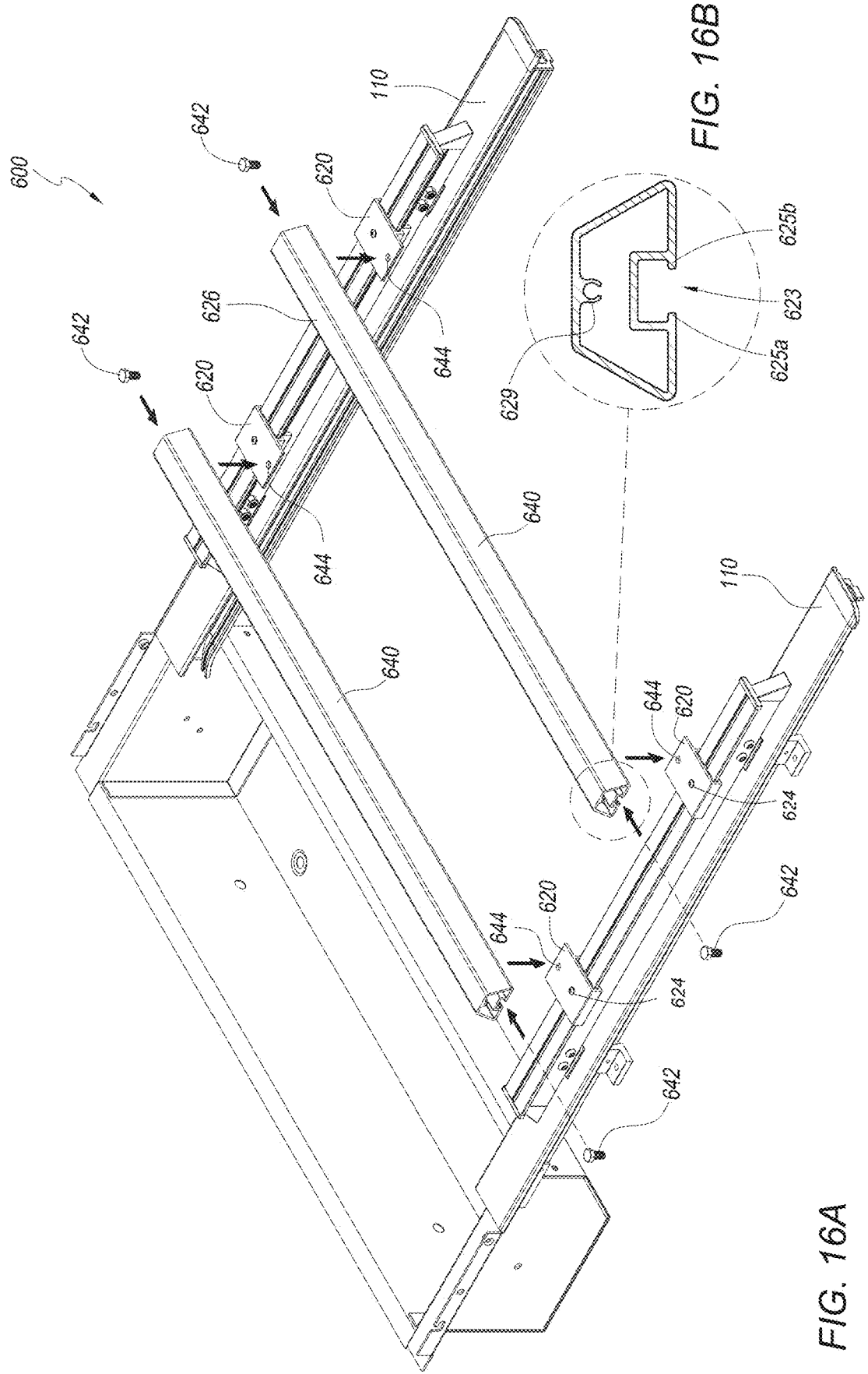
Figure 17:
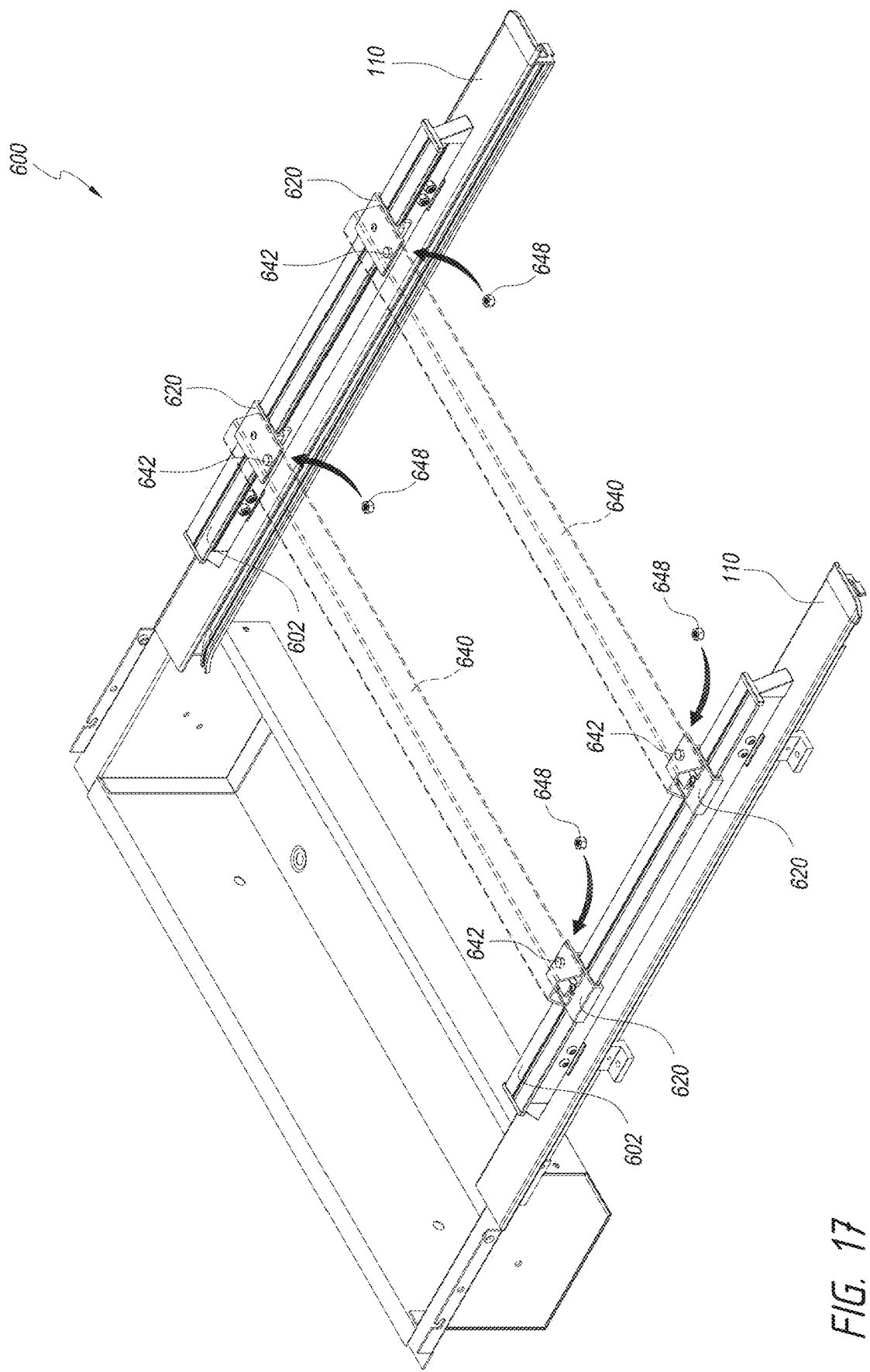

In some embodiments, the cross-section of the cross bars 620 includes two minor flanges 625a, 625b that extend from the bottom flange inwardly partially across the recess 623. Such flanges 625a, 625b can help the cross bar 640 secure to the glider 620 with a fastener 642 as described below. FIGS. 16A-17 shows a fastener 642 (e.g., a bolt) and FIG. 17 shows a nut 648. Bolt 642 can be placed within the recess 623 of the cross bar 640 such that a head of the bolt 642 is above the minor flanges 625a, 625b. Further, bolt 642 can be placed within the recess 623 and into the through-hole 644 in a top portion of the glider 620. Such placement of the bolts 642 within the recess 623 can occur before or after the cross bar 640 is placed atop and/or in contact with the glider 620. When bolt 642 is placed within the recess 623 and dropped into the through-hole 644, the head of bolt 642 can contact the minor flanges 625a, 625b. Thereafter, nut 648 can be threaded onto a threaded portion of the bolts 642 from underneath the glider 620. Once threaded, the nut 648 can contact and/or press against a bottom surface of the glider 620 (e.g., a bottom surface of the top portion 620a of glider 620) and can thus secure the cross bar 640 to the glider 620. When the cross bar 640 is secured to the glider 620, the recess 623 provides space for the head of the bolt 642 to fit and, at the same time, a bottom surface of the cross bar 640 can lay flush against a top surface of the glider 620.

Figure 18:
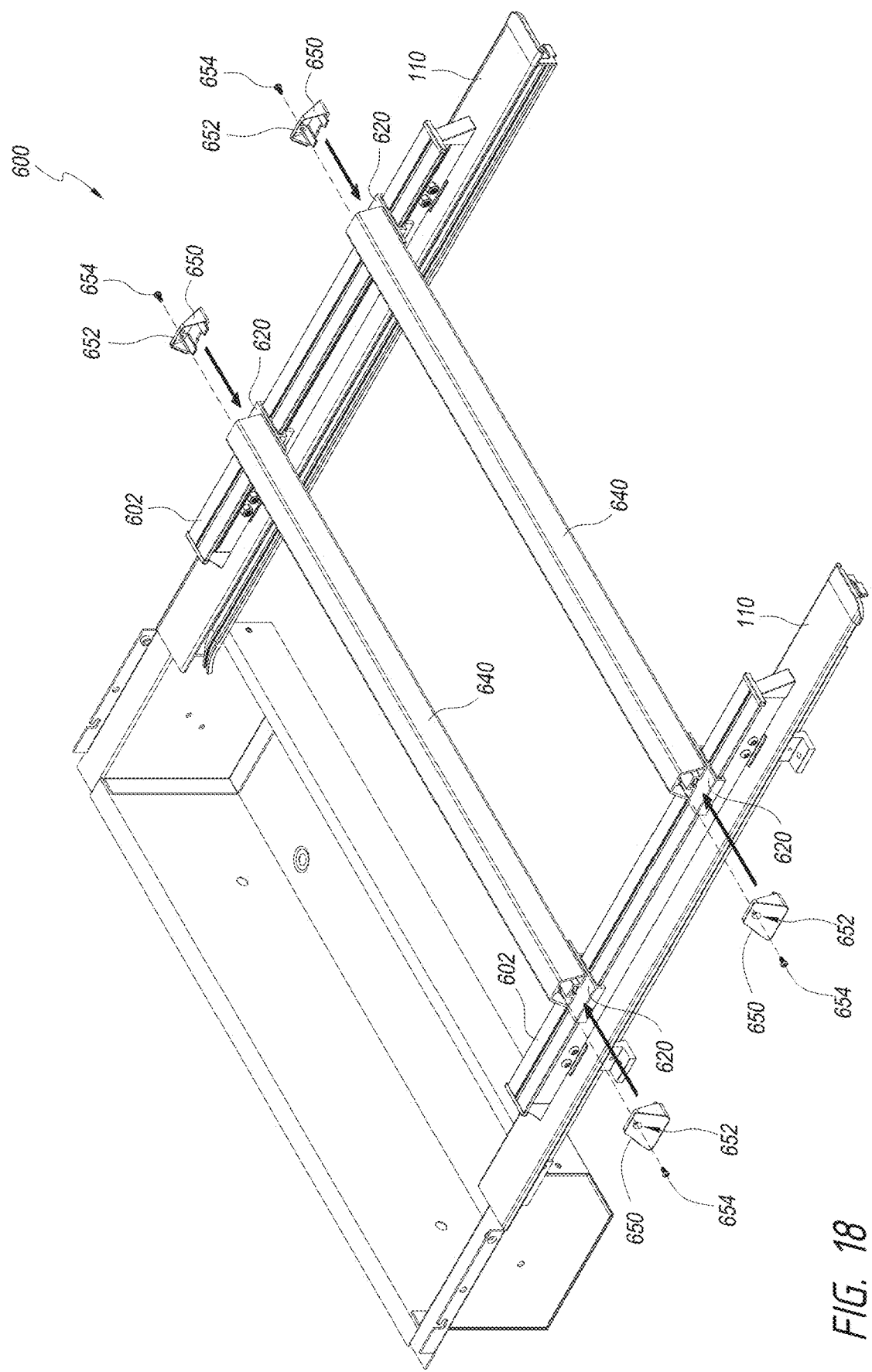

FIG. 18 illustrates end pieces 650 which can be secured to ends of the cross bars 640. The end pieces 650 can be sized and/or shaped corresponding with the cross-section of the cross bars 640. End pieces 650 can comprise a through-hole 652 configured to receive a fastener 654. Fastener 654 can pass and/or thread through through-hole 652 and secure to through-holes 629 on ends of the cross bars 640. Thus, the end pieces 650 can close hollow and/or open ends of the cross bars 640.

Figure 19:
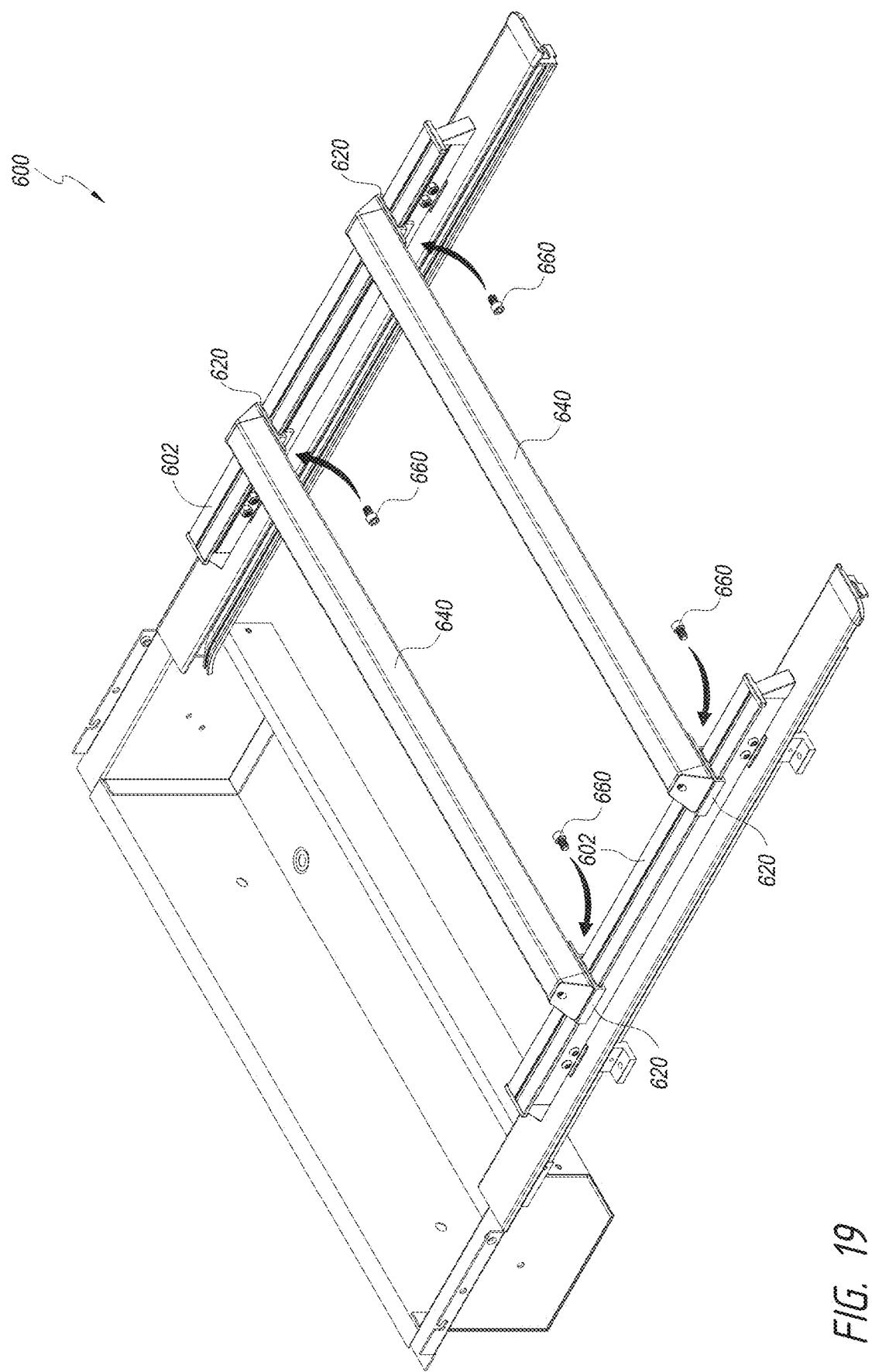

FIG. 19 illustrates how gliders 620 can be at least partially secured to the tracks 602 using fastener(s) 660 (for example, a screw). For example, a fastener 660 can be positioned through a through-hole in a surface of glider 620 which is proximate to a side of track 602 and can be at least partially received in a recess extending along the side of the track 602. In such configuration, the fastener 660 can be tightened and/or inserted (for example, inserted toward a surface within the recess) so as to restrict and/or reduce the likelihood of relative movement of the glider 620 along track 602.

The rack assembly 600 discussed herein can be assembled a variety of different ways. For example, the rack assembly 600 can be assembled above a truck bed of a vehicle by securing the side rails 110 to sidewalls of the truck bed, securing portions of the mounting brackets 604 to the sidewalls of the truck bed, and securing other portions of the mounting brackets 604 to tracks 602. The securement of the mounting brackets 604 to the sidewalls of the truck bed and/or to the tracks 602 can occur before or after passing a portion of the mounting brackets 604 through openings 606 in the side rails 110. As discussed above, the side rails 110 can be retrofitted to include openings 606 or such side rails 110 can be manufactured to include such openings 606. As discussed above, when the mounting bracket 604 is secured to the track 602, a gap can exist between a bottom surface of the tracks 602 and a top surface of the side rails 110 so that a primary vertical load applied to the rack assembly 600 is supported by the sidewalls of the truck bed as opposed to the side rails 110.

Figure 21B:
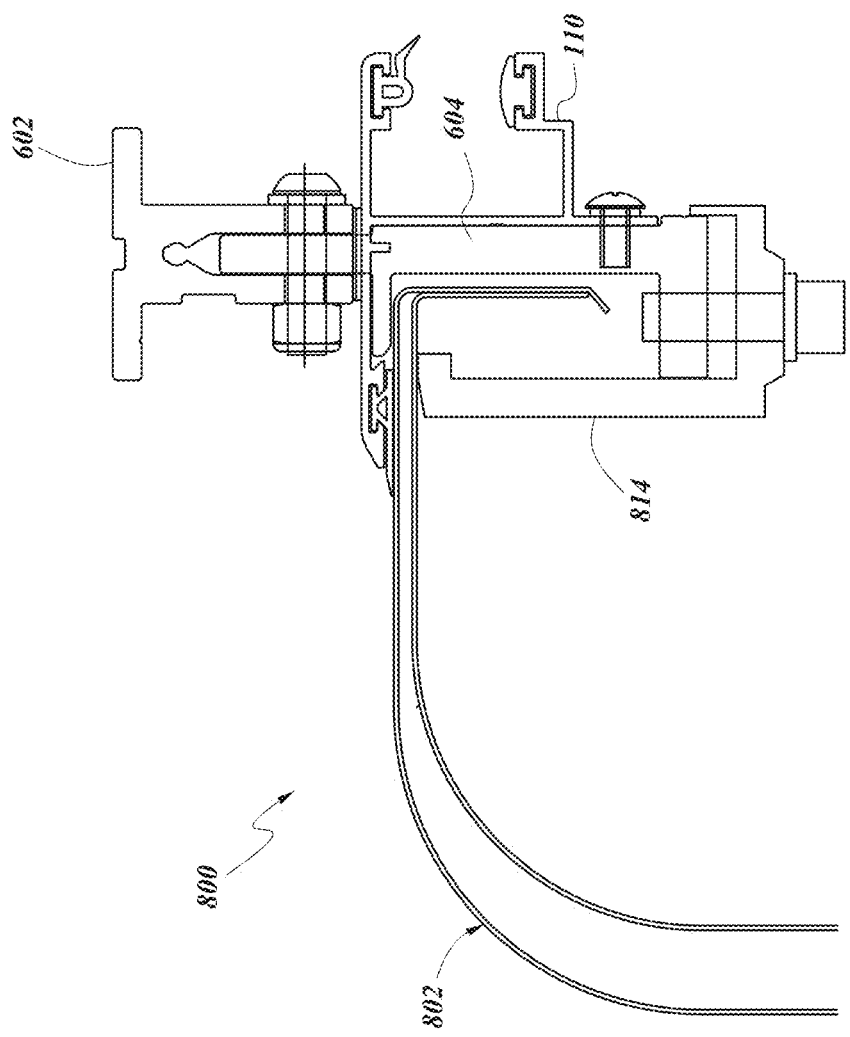

As discussed above, the rack assembly 600 can mount to sidewalls of the truck bed of a vehicle and can transfer additional vertical load directly to the sidewalls as opposed to transferring such additional load to the side rails. As also discussed below, a first portion (e.g., bottom portion 604c) of the mounting brackets 604 can include one or more through-holes 615 which can align with holes in a clamp (such as clamp 814) configured to secure the mounting brackets 604 to a sidewall of the truck bed. FIGS. 21A-21B illustrate another example method and an assembly 800 for securing the rack assembly 600 to the sidewalls 802 of a vehicle using the mounting brackets 604. As shown, mounting assembly 800 can include a clamp 814 which can secure to the first portion (for example, bottom portion 604c) of the mounting bracket 604 with a fastener 818 (such as a socket cap screw). The fastener 818 can pass and/or thread through a hole in the clamp 814 and hole 615 in the mounting bracket 604 at a first portion of the clamp 814 (see FIGS. 21A-21C). A second portion of the clamp 814 can contact and secure to a portion of the truck sidewall 802 (such as to an interior surface of the sidewall 802. A washer 816 can be placed between the fastener 818 head and a surface of the first portion of the clamp 814. Side rails 110 can be secured to a side of the mounting bracket 604 with a fastener 810 near a bottom portion of the side rail 110, and a washer 812 can be placed in between the side of the mounting bracket 604 and a surface of the side rail 110.

When the mounting bracket 604 is secured to the side wall 802 along with the clamp 814, an intermediate portion 604b of the mounting bracket 604 can contact a top edge of the side wall 802. In such configuration, the intermediate portion 604b can sit vertically between the side rail 110 and the side wall 802 and can transfer vertical load from the tracks 602 directly to the sidewalls 802. In some embodiments, the mounting brackets 604 can transfer a primary vertical load from the tracks 602 to the sidewalls 802. As discussed above, a first portion of the mounting brackets 604 can secure to clamp 814 and a second portion of the mounting brackets 604 can pass through opening 606 in the side rail 110 and secure to the track 602. Referring to FIG. 21C, the first portion can be bottom portion 604c and the second portion can be top portion 604a. The intermediate portion 604b can extend from a stem 604d of the mounting bracket 604 in a transverse direction (e.g., a generally perpendicular direction) and/or can be generally parallel to the bottom portion 604c which can also extend from the stem 604d in a transverse direction (e.g., a generally perpendicular direction). When the mounting bracket 604 is secured to the side wall 802 via clamp 814, the intermediate portion 604b can be substantially parallel to a top surface and/or a top edge of the side walls 802 and can contact and/or press against the surface. As shown in FIGS. 21A-21B, top portion 604a of mounting bracket 604 can extend vertically upward through opening 606 in side rail 110, and the bottom portion of the track 602 (which can comprise two spaced-apart stems 602a, 602b) can receive the top portion 604a in between stems 602a, 602b. As discussed above, seal 608 can be placed around the mounting brackets 604 and/or atop the side rails 110 at openings 606 in side rails 110 (see FIGS. 19 and 21A). As also discussed above, the mounting brackets 604 and the tracks 602 can have corresponding through-holes 612, 613 that allow fasteners 616 to pass therethrough to secure the mounting brackets 604 and tracks 602 together along with nuts 614. Washer 808 can be placed between a head of fastener 616 and a surface of stem 602b. FIG. 21B shows assembly 800 when fully assembled.

From the foregoing description, it will be appreciated that an inventive retractable tonneau cover and an inventive rack assembly for a truck bed are disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount. If the stated amount is 0 (e.g., none, having no), the above recited ranges can be specific ranges, and not within a particular % of the value. For example, within less than or equal to 10 wt./vol. % of, within less than or equal to 5 wt./vol. % of, within less than or equal to 1 wt./vol. % of, within less than or equal to 0.1 wt./vol. % of, and within less than or equal to 0.01 wt./vol. % of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using the same will be apparent to those of skill in the art. Accordingly, it should be understood that various applications, modifications, materials, and substitutions can be made of equivalents without departing from the unique and inventive disclosure herein or the scope of the claims.

What is claimed is:

1. A tonneau cover and rack assembly configured to mount to sidewalls of a vehicle, the assembly comprising:
    a first side rail configured to be secured to a first sidewall of the vehicle;
    a second side rail configured to be secured to a second sidewall of the vehicle;
    a cover configured to be received by the first and second side rails and further configured to be moved between a retracted position and an extended position over a truck bed of the vehicle;
    a first plurality of mounting brackets configured to be secured to the first sidewall of the vehicle and extend through openings in the first side rail when the first side rail is secured to the first sidewall of the vehicle;
    a second plurality of mounting brackets configured to be secured to the second sidewall of the vehicle and extend through openings in the second side rail when the second side rail is secured to the second sidewall of the vehicle;
    at least one cross bar; and
    a first track and a second track, the first and second tracks configured to support the at least one cross bar and allow the at least one cross bar to extend across the truck bed of the vehicle above the cover, wherein the first and second tracks are configured to be secured to the first and second plurality of mounting brackets at a position above the first and second pair of side rails such that a primary vertical load is transferred to the first and second sidewalls of the vehicle instead of the first and second side rails.

2. The tonneau cover and rack assembly of claim 1, further comprising a first glider configured to be coupled to the first track and a second glider configured to be coupled to the second track, wherein the first and second gliders are configured to be secured to the at least one cross bar.

3. The tonneau cover and rack assembly of claim 2, wherein the first glider is configured to be movably coupled to the first track and the second glider is configured to be movably coupled to the second track.

4. The tonneau cover and rack assembly of claim 3, wherein:
   the first glider comprises a substantially horizontal top portion and side arms extending laterally from the top portion of the first glider, the side arms of the first glider configured to wrap around a portion of the first track so as to restrict movement of the first glider relative to the first track in a direction that is generally perpendicular to a length of the first track; and
   the second glider comprises a substantially horizontal top portion and side arms extending laterally from the top portion of the second glider, the side arms of the second glider configured to wrap around a portion of the second track so as to restrict movement of the second glider relative to the second track in a direction that is generally perpendicular to a length of the second track.

5. The tonneau cover and rack assembly of claim 3, further comprising:
   a first pair of end caps configured to be secured to ends of the first track to inhibit the first glider from sliding off the first track; and
   a second pair of end caps configured to be secured to ends of the second track to inhibit the second glider from sliding off the second track.

6. The tonneau cover and rack assembly of claim 1, further comprising:
   a first plurality of clamps, each of the first plurality of clamps configured to secure one of the first plurality of mounting brackets to the first sidewall of the vehicle; and
   a second plurality of clamps, each of the second plurality of clamps configured to secure one of the second plurality of mounting brackets to the second sidewall of the vehicle.

7. The tonneau cover and rack assembly of claim 1, wherein:
   the first track comprises a top portion and two stems extending transverse relative to the top portion of the first track;
   a portion of each of the first plurality of mounting brackets is configured to secure to the first track between the two stems of the first track;
   the second track comprises a top portion and two stems extending transverse relative to the top portion of the second track; and
   a portion of each of the second plurality of mounting brackets is configured to secure to the second track between the two stems of the second track.

8. A rack assembly configured to mount to sidewalls of a vehicle, the rack assembly comprising:
   a first side rail configured to be secured to a first sidewall of the vehicle;
   a second side rail configured to be secured to a second sidewall of the vehicle;
   a first plurality of mounting brackets configured to be secured to the first sidewall of the vehicle and extend through openings in the first side rail when the first side rail is secured to the first sidewall of the vehicle;
   a second plurality of mounting brackets configured to be secured to the second sidewall of the vehicle and extend through openings in the second side rail when the second side rail is secured to the second sidewall of the vehicle;
   at least one cross bar; and
   a first track and a second track, the first and second tracks configured to support the at least one cross bar and allow the at least one cross bar to extend across the truck bed of the vehicle, wherein the first and second tracks are configured to be secured to the first and second plurality of mounting brackets such that a primary vertical load is transferred to the first and second sidewalls of the vehicle instead of the first and second side rails.

9. The rack assembly of claim 8, further comprising a first glider configured to be coupled to the first track and a second glider configured to be coupled to the second track, wherein the first and second gliders are configured to be secured to the at least one cross bar.

10. The rack assembly of claim 9, wherein the first glider is configured to be movably coupled to the first track and the second glider is configured to be movably coupled to the second track.

11. The rack assembly of claim 10, wherein:
    the first glider comprises a substantially horizontal top portion and side arms extending laterally from the top portion of the first glider, the side arms of the first glider configured to wrap around a portion of the first track so as to restrict movement of the first glider relative to the first track in a direction that is generally perpendicular to a length of the first track; and
    the second glider comprises a substantially horizontal top portion and side arms extending laterally from the top portion of the second glider, the side arms of the second glider configured to wrap around a portion of the second track so as to restrict movement of the second glider relative to the second track in a direction that is generally perpendicular to a length of the second track.

12. The rack assembly of claim 10, further comprising:
    a first pair of end caps configured to be secured to ends of the first track to inhibit the first glider from sliding off the first track; and
    a second pair of end caps configured to be secured to ends of the second track to inhibit the second glider from sliding off the second track.

13. The rack assembly of claim 8, further comprising:
    a first plurality of clamps, each of the first plurality of clamps configured to secure one of the first plurality of mounting brackets to the first sidewall of the vehicle; and
    a second plurality of clamps, each of the second plurality of clamps configured to secure one of the second plurality of mounting brackets to the second sidewall of the vehicle.

14. The rack assembly of claim 8, wherein:
    the first track comprises a top portion and two stems extending transverse relative to the top portion of the first track;
    a portion of each of the first plurality of mounting brackets is configured to secure to the first track between the two stems of the first track; and
    the second track comprises a top portion and two stems extending transverse relative to the top portion of the second track; and
    a portion of each of the second plurality of mounting brackets is configured to secure to the second track between the two stems of the second track.

15. A rack assembly configured to mount to sidewalls of a vehicle, the rack assembly comprising:
    a pair of side rails configured to be secured to the sidewalls of the vehicle;

a pair of tracks for supporting one or more cross bars configured to extend across a truck bed of the vehicle; and a plurality of mounting brackets, each of the plurality of mounting brackets configured to be secured to one of the sidewalls of the vehicle and extend through an opening in one of the pair of side rails, each of the plurality of mounting brackets configured to be secured to one of the pair of tracks such that a primary vertical load is transferred to the sidewalls of the vehicle instead of the pair of side rails.

16. The rack assembly of claim 15, wherein the pair of tracks comprises a first track and a second track, and wherein the rack assembly further comprises a first glider configured to be movably coupled to the first track, a second glider configured to be movably coupled to the second track, and a cross bar configured to be secured to the first and second gliders.

17. The rack assembly of claim 16, wherein:
the first glider comprises a substantially horizontal top portion and side arms extending laterally from the top portion of the first glider, the side arms of the first glider configured to wrap around a portion of the first track so as to restrict movement of the first glider relative to the first track in a direction that is generally perpendicular to a length of the first track; and the second glider comprises a substantially horizontal top portion and side arms extending laterally from the top portion of the second glider, the side arms of the second glider configured to wrap around a portion of the second track so as to restrict movement of the second glider relative to the second track in a direction that is generally perpendicular to a length of the second track.

18. The rack assembly of claim 17, further comprising:
a first pair of end caps configured to be secured to ends of the first track to inhibit the first glider from sliding off the first track; and a second pair of end caps configured to be secured to ends of the second track to inhibit the second glider from sliding off the second track.

19. The rack assembly of claim 15, further comprising:
a first plurality of clamps, each of the first plurality of clamps configured to secure one of the first plurality of mounting brackets to a first sidewall of the vehicle; and a second plurality of clamps, each of the second plurality of clamps configured to secure one of the second plurality of mounting brackets to a second sidewall of the vehicle.

20. The rack assembly of claim 15, wherein:
the first track comprises a top portion and two stems extending transverse relative to the top portion of the first track;

a portion of each of the first plurality of mounting brackets is configured to secure to the first track between the two stems of the first track;

the second track comprises a top portion and two stems extending transverse relative to the top portion of the second track; and a portion of each of the second plurality of mounting brackets is configured to secure to the second track between the two stems of the second track.

* * * * *